(12) United States Patent
Shibata

(10) Patent No.: US 9,934,455 B2
(45) Date of Patent: Apr. 3, 2018

(54) QUANTIZATION METHOD AND IMAGE PROCESSOR

(71) Applicant: FUJIFILM Corporation, Tokyo (JP)

(72) Inventor: Hiroyuki Shibata, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 256 days.

(21) Appl. No.: 15/081,204

(22) Filed: Mar. 25, 2016

(65) Prior Publication Data

US 2016/0283832 A1    Sep. 29, 2016

(30) Foreign Application Priority Data

Mar. 27, 2015   (JP) ................ 2015-066573

(51) Int. Cl.
  *G06K 15/02*   (2006.01)
  *G06K 15/10*   (2006.01)

(52) U.S. Cl.
  CPC ....... *G06K 15/1881* (2013.01); *G06K 15/102* (2013.01)

(58) Field of Classification Search
  None
  See application file for complete search history.

(56) References Cited

U.S. PATENT DOCUMENTS

2005/0140998 A1* 6/2005 Gao ............... H04N 1/4051
                                                 358/1.9
2006/0215716 A1* 9/2006 Luo ............... H01S 5/0687
                                                 372/38.08

FOREIGN PATENT DOCUMENTS

| JP | 2009-18479 A   | 1/2009 |
| JP | 2011-121248 A  | 6/2011 |
| JP | 2012-176543 A  | 9/2012 |

\* cited by examiner

*Primary Examiner* — John Wallace
(74) *Attorney, Agent, or Firm* — Studebaker & Brackett PC

(57) ABSTRACT

A quantization method includes: quantizing first image data, and converting the first image data to second image data that indicates a binary or multivalued quantized pattern with a smaller number of gradations than that of the first image data, for which dots are arranged by the same recording element for individual pixels of a pixel column along a first direction respectively and dots are arranged at a plurality of different timings for individual pixels of a pixel column along a second direction orthogonal to the first direction; and optimizing the quantization in at least some gradations, and reducing dispersion of a generation frequency of a dot arrangement for each relative positional relation between a pixel of interest in the case that individual pixels within the quantized pattern are successively defined as the pixel of interest and a plurality of vicinity pixels positioned in the vicinity of the pixel of interest.

13 Claims, 28 Drawing Sheets

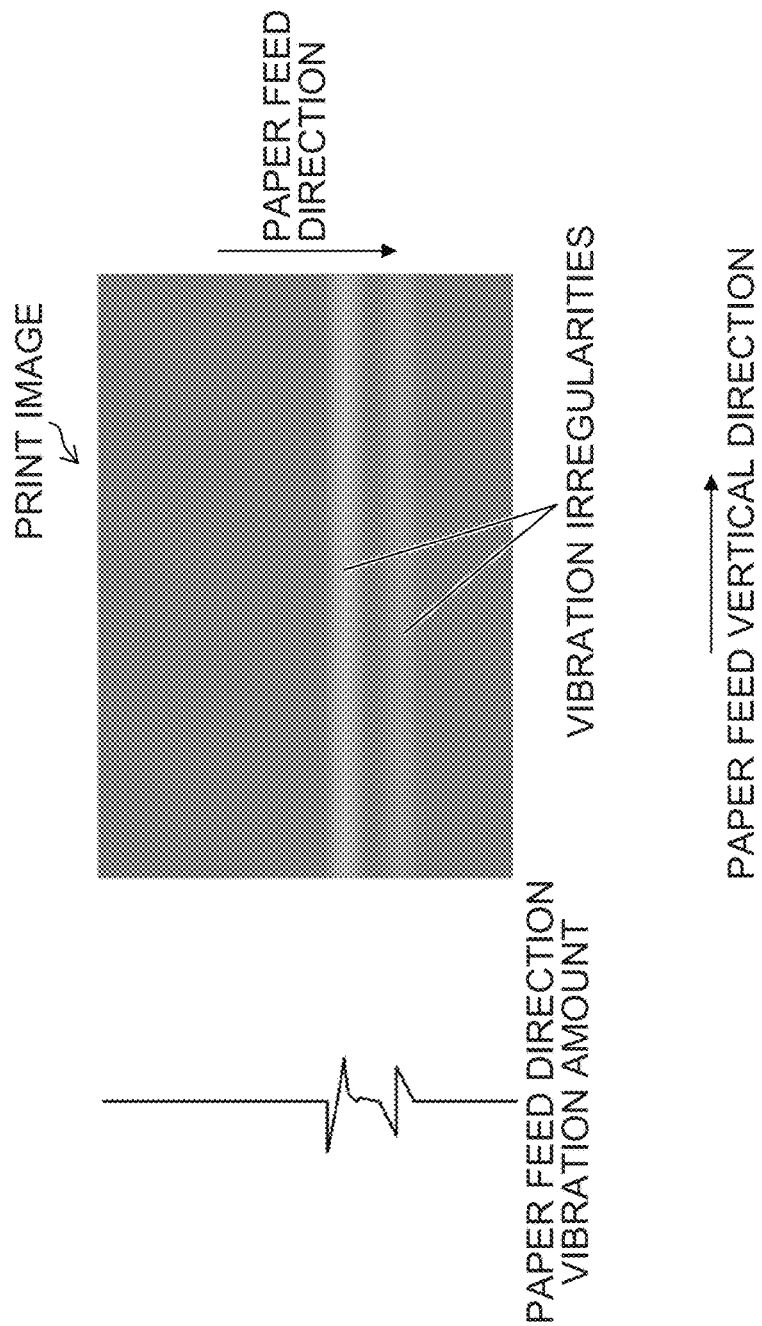

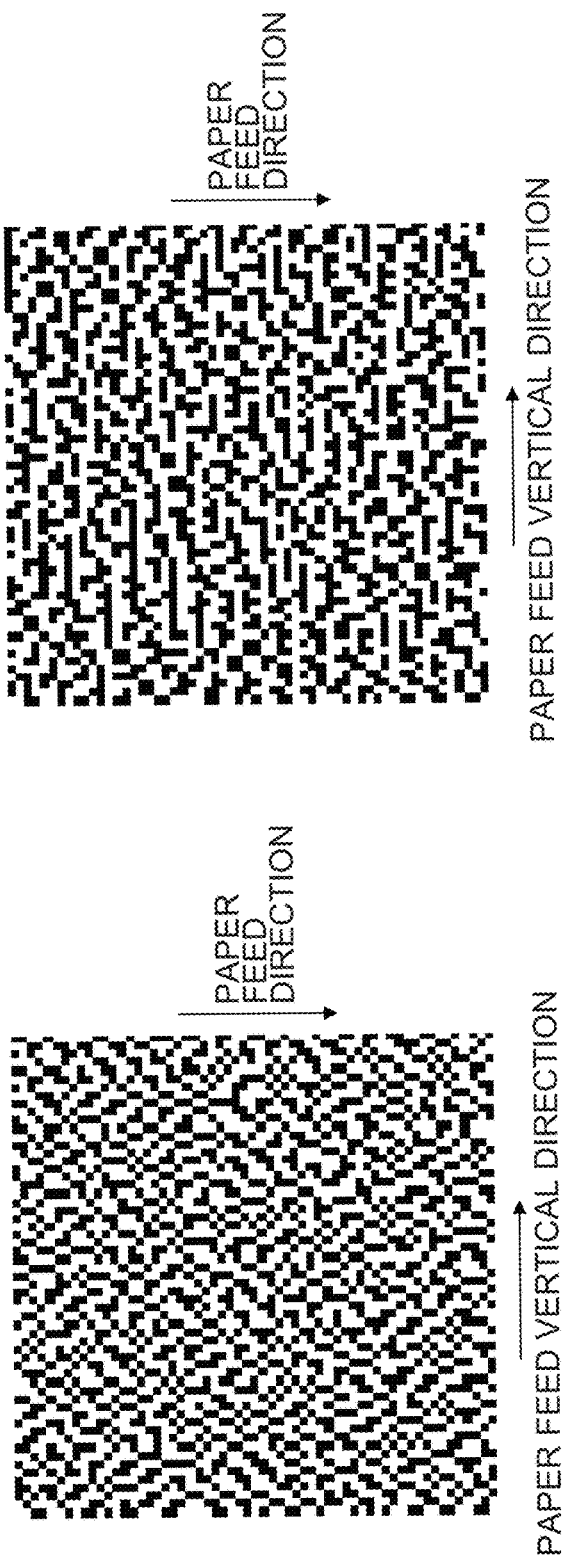

NOZZLE COLUMN VERTICAL DIRECTION
NOZZLE COLUMN DIRECTION

FIG.8A STATE WITHOUT SHIFT

FIG.8B CASE THAT LEFT PIXEL COLUMN IS SHIFTED BY -1px

FIG.8C CASE THAT LEFT PIXEL COLUMN IS SHIFTED BY +1px

FIG.8D CASE THAT RIGHT PIXEL COLUMN IS SHIFTED BY +1px

FIG.8E CASE THAT RIGHT PIXEL COLUMN IS SHIFTED BY -1px

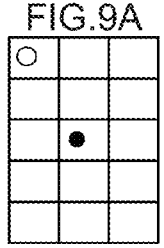
FIG.9A
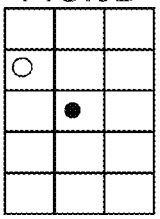
FIG.9B
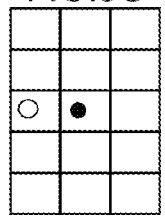
FIG.9C
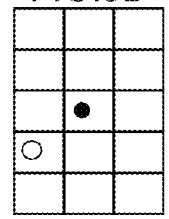
FIG.9D
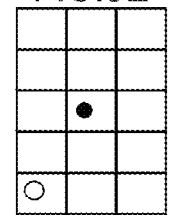
FIG.9E
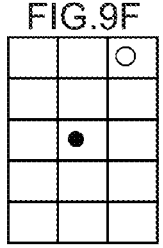
FIG.9F
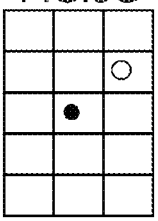
FIG.9G
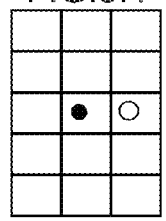
FIG.9H
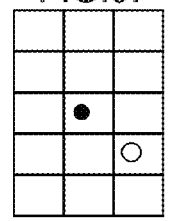
FIG.9I
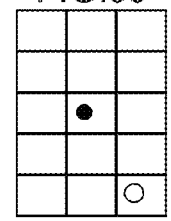
FIG.9J
FIG.10
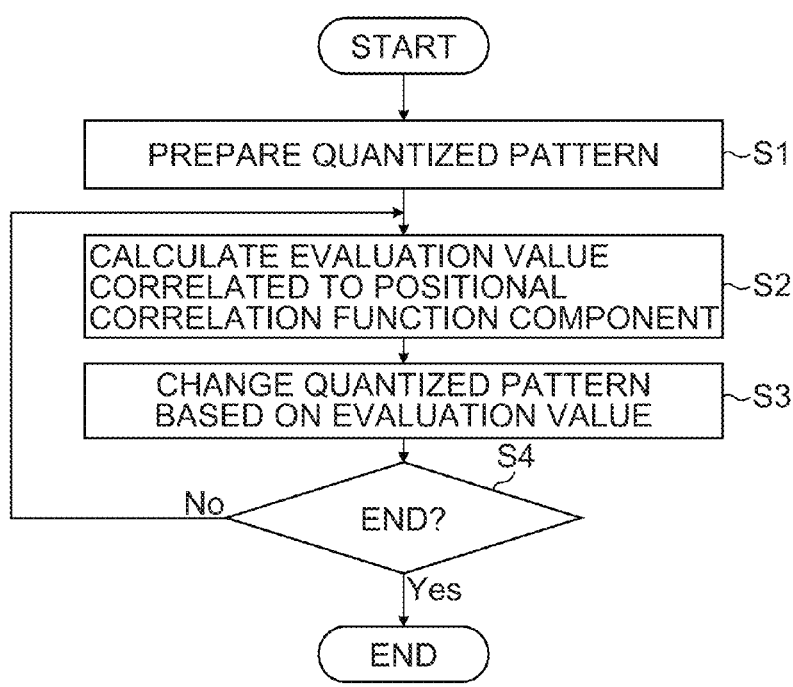

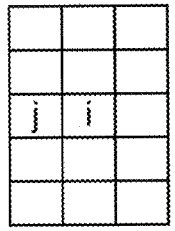
FIG.11A  correl (i, j,-1,0)
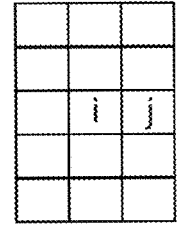
FIG.11B  correl (i, j,1,0)
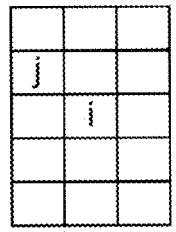
FIG.11C  correl (i, j,-1,-1)
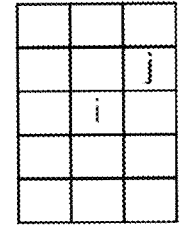
FIG.11D  correl (i, j,1,-1)
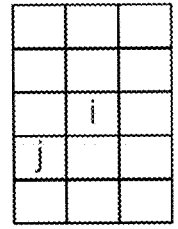
FIG.11E  correl (i, j,-1,1)
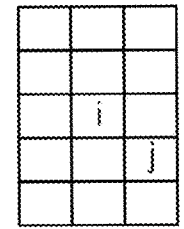
FIG.11F  correl (i, j,1,1)
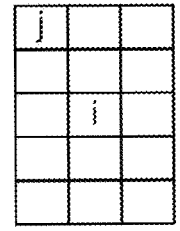
FIG.11G  correl (i, j,-1,-2)
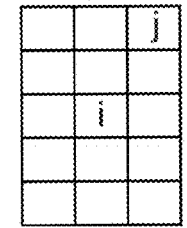
FIG.11H  correl (i, j, 1,-2)
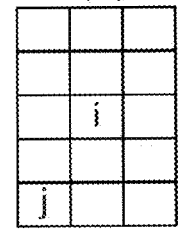
FIG.11I  correl (i, j,-1,2)
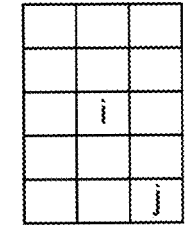
FIG.11J  correl (i, j,1,2)

ERROR DIFFUSION PROCESSING ORDER

PAPER FEED DIRECTION

A: ERROR DIFFUSION MATRIX LATERAL DIRECTION COMPONENT

QUANTIZATION METHOD AND IMAGE PROCESSOR

CROSS-REFERENCE TO RELATED APPLICATIONS

The present application claims priority under 35 U.S.C. § 119 to Japanese Patent Application No. 2015-066573, filed on Mar. 27, 2015. The above application is hereby expressly incorporated by reference, in its entirety, into the present application.

BACKGROUND OF THE INVENTION

Field of the Invention

The present invention relates to a quantization method and an image processor, and in particular relates to a quantization technology that converts continuous tone images to binary or multivalued images.

Description of the Related Art

An inkjet printer that performs printing on a recording medium such as a paper sheet by a single path system using a print head for which nozzles that eject ink are two-dimensionally arranged is known. In the case that relative vibrations are generated in a paper feed direction between the print head and the paper sheet in such a printer, belt-like irregularities (vibration irregularities) extending along a paper feed vertical direction are generated.

Japanese Patent Application Laid-Open No. 2012-176543 discloses a technology of suppressing irregularities by controlling a halftone pattern in the case that the relative vibrations between the print head and the paper sheet are generated in the paper feed vertical direction (a width direction of paper). By this technology, irregularities generated in the paper feed direction by the relative vibrations in the paper feed vertical direction can be effectively suppressed.

Also, a similar problem occurs also at a joint of head modules of a print head. A print head of the single path system for which a plurality of head modules are alternately shifted in the paper feed direction and arranged in a line in the paper feed vertical direction is known. In such a print head, at a joint area between adjacent head modules, by arranging both head modules so as to overlap in the paper feed direction, nozzles of both head modules are practically alternately arranged along the paper feed vertical direction. Here, when the arrangement in the paper feed direction of the head modules is shifted, a difference is generated in patterns to be printed between the joint area and the other area, and belt-like irregularities (inter-module joint irregularities) extending along the paper feed direction are generated.

Japanese Patent Application Laid-Open No. 2009-018479 and Japanese Patent Application Laid-Open No. 2011-121248 disclose methods of solving problems of graininess deterioration and density fluctuation at a joint between head modules due to a position shift of the head modules or the like by dot distribution and halftone processing.

SUMMARY OF THE INVENTION

The technology described in Japanese Patent Application Laid-Open No. 2012-176543 is effective even in the case that vibrations are generated in the paper feed direction, however, there is a problem that graininess is poor. Also, though irregularities can be suppressed in a predetermined gradation area, there is a problem that the characteristic cannot be always satisfied in the entire gradations.

Also, the technologies of Japanese Patent Application Laid-Open No. 2009-018479 and Japanese Patent Application Laid-Open No. 2011-121248 are the technologies that are effective in the case that a plurality of nozzles overlap in the same area in a joint area, and there is a problem that they cannot be applied in the case that the plurality of nozzles do not overlap in the same area.

The present invention is implemented in consideration of such situations, and an object is to provide a quantization method and an image processor that reduce visibility of vibration irregularities and inter-module joint irregularities.

In order to achieve the object, one aspect of the quantization method includes: a quantization step of quantizing first image data, and converting the first image data to second image data that indicates a binary or multivalued quantized pattern with a smaller number of gradations than that of the first image data, for which dots are arranged by the same recording element for individual pixels of a pixel column along a first direction respectively and dots are arranged at a plurality of different timings for individual pixels of a pixel column along a second direction orthogonal to the first direction, and an optimization step of optimizing the quantization step in at least some gradations, and reducing dispersion of a generation frequency of a dot arrangement for each relative positional relation between a pixel of interest in the case that individual pixels within the quantized pattern are successively defined as the pixel of interest and vicinity pixels that are the plurality of vicinity pixels positioned in the vicinity of the pixel of interest and include an adjacent pixel adjacent to the pixel of interest in the second direction and the next adjacent pixel successively adjacent to the adjacent pixel in the first direction, compared to the dispersion before optimization.

According to the present aspect, the visibility of density vibration irregularities and inter-module joint irregularities can be reduced. Also, the quantized pattern can be designed with a higher degree of freedom.

While an evaluation value of the pattern belonging to each pixel column needs to be calculated in Japanese Patent Application Laid-Open No. 2009-018479 and Japanese Patent Application Laid-Open No. 2011-121248, it is not needed in the present aspect. Therefore, the quantized pattern can be generated more easily.

It is preferable that the vicinity pixels are the adjacent pixel, a first next adjacent pixel adjacent to the adjacent pixel in the first direction, and a second next adjacent pixel adjacent to the first next adjacent pixel in the first direction, the second next adjacent pixel being different from the adjacent pixel. Therefore, even when dots arranged at the pixel column adjacent in the second direction are shifted by about one pixel in the first direction, vibration irregularities and inter-module joint irregularities can be suppressed.

It is preferable that the optimization step includes an evaluation value calculation step of calculating a plurality of evaluation values correlated to a positional correlation function component for each relative positional relation respectively, and a change step of changing the quantized pattern on the basis of a difference of the plurality of evaluation values. From this, the quantization step can be appropriately optimized.

It is preferable that the optimization step includes an optimum determination evaluation value calculation step of calculating an optimum determination evaluation value correlated to dispersion of the plurality of evaluation values correlated to a positional correlation function component for each relative positional relation, and a determination step of determining whether or not the quantized pattern is optimum on the basis of the optimum determination evaluation value. From this, the quantization step can be appropriately optimized.

It is preferable that the optimum determination evaluation value includes an evaluation value correlated to low frequency noise and graininess. From this, a halftone pattern that causes deterioration of graininess of images and generation of low frequency noise can be prevented from being selected as an optimum value.

It is preferable that the optimization step reduces the dispersion of the generation frequency for an image of a first kind value of the binary value and the multiple value, or an image for which a combination of the first kind value and a second kind value different from the first kind value is extracted, compared to the dispersion before optimization. From this, the quantization step can be appropriately optimized.

It is preferable that the quantization step quantizes the first image data by an error diffusion method, and the optimization step optimizes an error diffusion coefficient used in the error diffusion method. From this, the quantization step that uses the error diffusion method can be appropriately optimized.

It is preferable that the quantization step quantizes the first image data by an error diffusion method, and includes an evaluation pattern generation step of generating an evaluation pattern which is a temporary quantized pattern using a temporary error diffusion coefficient, and an updating step of updating the temporary error diffusion coefficient as an optimum error diffusion coefficient in the case that the evaluation pattern is determined as being optimum by the determination step. From this, the quantization step that uses the error diffusion method can be appropriately optimized.

It is preferable that the quantization step quantizes the first image data using a threshold matrix, and the optimization step optimizes the threshold matrix. From this, the quantization step that uses the threshold matrix can be appropriately optimized.

It is preferable that the quantization step quantizes the first image data using a threshold matrix, the evaluation value calculation step calculates the plurality of evaluation values for a pattern for which the threshold matrix is binarized or multivalued by a specific threshold respectively, and the change step optimizes the threshold matrix by changing the dot arrangement corresponding to the evaluation value with a relatively large difference from an average value of the plurality of evaluation values from the plurality of evaluation values, for the pattern for which the threshold matrix is binarized or multivalued by the specific threshold. From this, the quantization step that uses the threshold matrix can be appropriately optimized.

It is preferable that the second image data is recorded by an image recorder including: a recording head which is a recording head including a plurality of recording elements and has a two-dimensional recording element array for which a plurality of recording element columns with a plurality of recording elements arrayed in the second direction are arranged in the first direction; a moving device which relatively moves the recording head and a recording medium only once in the first direction; and a recording control device which is a recording control device that records the second image data by the recording head while relatively moving the recording head and the recording medium, arranges dots to the individual pixels of the pixel column along the first direction by the same recording element respectively, and arranges dots to the individual pixels of the pixel column along the second direction orthogonal to the first direction at different timings for each recording element column.

The quantization method according to the present aspect is applicable to quantization of image data recorded by an image recorder including a recording head having a two-dimensional recording element array for which a plurality of recording element columns with a plurality of recording elements arrayed in the second direction are arranged in the first direction.

It is preferable that the second image data is recorded by an image recorder including: a recording head which is a recording head including a plurality of recording elements and has a recording element column for which the plurality of recording elements are arranged along the second direction at an interval of M (2 or more) pixels; a moving device which is a moving device that relatively moves the recording head and a recording medium in the first direction, and includes a head scanning device that makes the recording head scan the recording medium back and forth in the first direction and a conveyance device that moves the recording medium in the second direction for each scan in the first direction of the recording head; and a recording control device which is a recording control device that records the second image data by the recording head while relatively moving the recording head and the recording medium, records the individual pixels of the pixel column along the first direction by the same recording element respectively in the scan of one time of the recording head, and records the individual pixels of the pixel column along the second direction at M kinds of different timings by the scan of M times.

The quantization method according to the present aspect is applicable to quantization of image data recorded by an image recorder including a recording head having a recording element column for which the plurality of recording elements are arranged along the second direction at an interval of M (2 or more) pixels. Note that the arrangement along the second direction at the interval of M pixels is not limited to the case that the plurality of recording elements are arranged linearly in the second direction at the interval of M pixels, and includes the case that projected recording elements are arranged at the interval of M pixels in a projected recording element column projected (orthogonally projected) so as to be lined along the second direction.

It is preferable that the second image data is recorded by an image recorder including: a recording head which is a recording head including a plurality of recording elements and is configured by joining a plurality of head modules where the plurality of recording elements are arranged respectively in the second direction, for which, at a joint of adjacent first head module and second head module, the recording elements of the first head module and the recording elements of the second head module are alternately arranged along the second direction; a moving device which relatively moves the recording head and a recording medium only once in the first direction; and a recording control device which is a recording control device that records the second image data by the recording head while relatively moving the recording head and the recording medium, and records the individual pixels of the pixel column along the second direction at the joint at different timings in the first head module and the second head module.

The quantization method according to the present aspect is applicable to quantization of image data recorded by a recording head configured by joining a plurality of head modules where the plurality of recording elements are arranged respectively in the second direction, for which, at a joint of adjacent first head module and second head module, the recording elements of the first head module and the recording elements of the second head module are alternately arranged along the second direction.

In order to achieve the object, one aspect of an image processor includes: an image acquisition device that acquires first image data; a quantization device that quantizes the first image data, and converts the first image data to second image data that indicates a binary or multivalued quantized pattern with a smaller number of gradations than that of the first image data, for which dots are arranged by the same recording element for individual pixels of a pixel column along a first direction respectively and dots are arranged at a plurality of different timings for individual pixels of a pixel column along a second direction orthogonal to the first direction; and an optimization device that optimizes the quantization device in at least some gradations, and reduces dispersion of a generation frequency of a dot arrangement for each relative positional relation between a pixel of interest in the case that individual pixels within the quantized pattern are successively defined as the pixel of interest and vicinity pixels that are the plurality of vicinity pixels positioned in the vicinity of the pixel of interest and include an adjacent pixel adjacent to the pixel of interest in the second direction and the next adjacent pixel successively adjacent to the adjacent pixel in the first direction, compared to the dispersion before optimization.

According to the present aspect, visibility of density vibration irregularities and inter-module joint irregularities can be reduced. Also, the quantized pattern can be designed with a higher degree of freedom.

According to the present invention, visibility of vibration irregularities and inter-module joint irregularities can be reduced.

BRIEF DESCRIPTION OF THE DRAWINGS

FIG. 1 is a diagram illustrating a vibration amount in a paper feed direction during printing and a printed image;

FIGS. 3A and 3B are diagrams illustrating a change of a halftone pattern in presence/absence of vibrations;

FIGS. 8A-8E are diagrams illustrating a change of the positional relation of the pixels in a vicinity area in the case that an ink impact position is shifted between rasters;

FIGS. 9A-9J are diagrams illustrating 10 kinds of arrangement patterns of two pixels;

FIG. 10 is a flowchart illustrating processing of an optimization method of a halftone pattern;

FIGS. 11A-11J are diagrams illustrating 10 kinds of arrangement combinations of two pixels;

DETAILED DESCRIPTION OF THE EMBODIMENTS

Hereinafter, preferred embodiments of the present invention are described in detail according to attached drawings.

<Generation of Vibration Irregularities>

FIG. 1 illustrates an image (printed image) printed (recorded) by a single path system using an inkjet two-dimensional print head, and a vibration amount of vibrations in a paper feed direction generated during printing. As illustrated in the figure, in the printed image, vibration irregularities extending along a vertical direction are generated accompanying generation of the vibrations. The generation principle of the vibration irregularities is to be described.

Figure 2A:
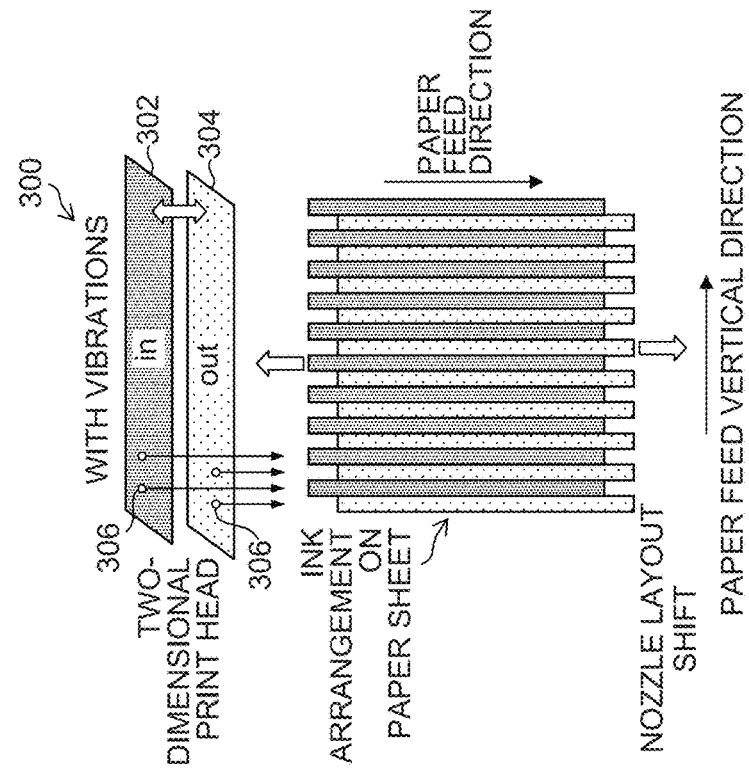
FIGS. 2A and 2B are diagrams for describing a shift of an arrangement of ink on a paper sheet due to presence/absence of vibrations.
Figure 2B:
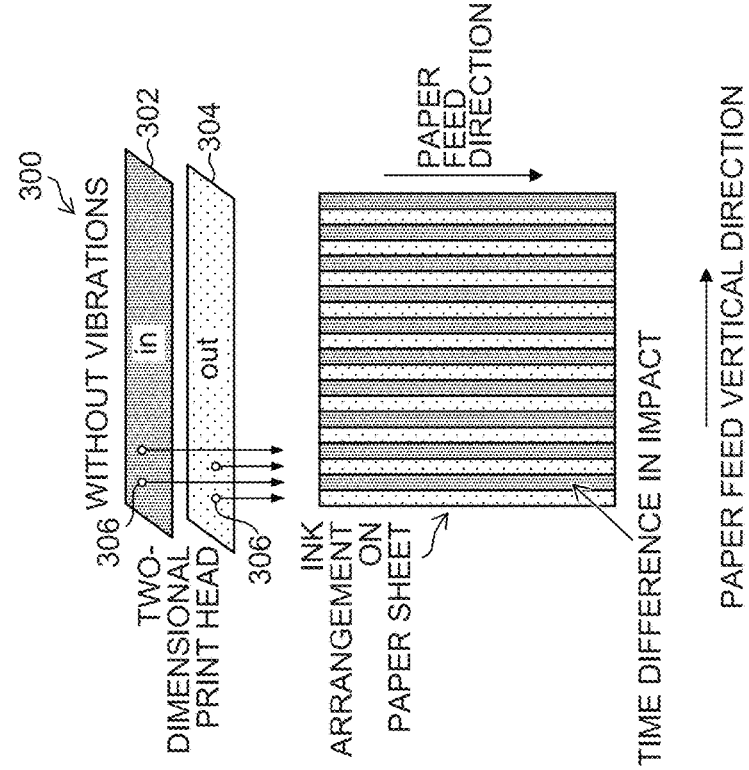

As illustrated in FIGS. 2A and 2B, a two-dimensional print head 300 (one example of a recording head) includes an upstream side nozzle column 302 arranged on an upstream side in the paper feed direction and a downstream side nozzle column 304 arranged on a downstream side in the paper feed direction, and in the upstream side nozzle column 302 and the downstream side nozzle column 304, nozzles 306 are lined and arranged at an interval of two pixels in a paper feed vertical direction and are alternately shifted by one pixel each and arranged respectively in the paper feed vertical direction. Thus, in a projected nozzle column (one example of a projected recording element column) for which the nozzles 306 are projected (orthogonally projected) so as to be lined along the paper feed vertical direction, the nozzles 306 of the upstream side nozzle column 302 and the nozzles 306 of the downstream side nozzle column 304 are alternately arranged nozzle by nozzle. That is, the nozzles 306 of the upstream side nozzle column 302 and the nozzles 306 of the downstream side nozzle column 304 are alternately arranged practically nozzle by nozzle along the paper feed vertical direction.

For an image printed by such a two-dimensional print head 300, when focusing on a pixel column lined in the paper feed direction, ink is ejected (recorded) by the same nozzle 306 respectively for individual pixels. Also, when focusing on a pixel column lined in the paper feed vertical direction (one example of x direction), a first pixel for which the ink is ejected from the nozzle 306 of the upstream side nozzle column 302 at a first timing and a second pixel for which the ink is ejected from the nozzle 306 of the downstream side nozzle column 304 at a second timing that is delayed (different) by fixed time from the first timing are alternately (cyclically) arranged. That is, the individual pixels of the pixel column along the paper feed vertical direction are deposited at different timings by the plurality of different nozzles.

FIG. 2A illustrates an arrangement of the ink on a paper sheet of the pixel column for which the ink is ejected by the nozzles 306 of the upstream side nozzle column 302 and the pixel column for which the ink is ejected by the nozzles 306 of the downstream side nozzle column 304, that are the pixel columns (rasters) along the paper feed direction in the case that printing is performed in a state without vibrations between the two-dimensional print head 300 and the paper sheet (not shown in the figure).

On the other hand, in the case that relative vibrations in the paper feed direction are generated between the two-dimensional print head 300 and the paper sheet (in the case that a vibration shift is generated), a time difference is generated in impacts on the paper sheet of the ink ejected from the nozzles 306 of the upstream side nozzle column 302 and the ink ejected from the nozzles 306 of the downstream side nozzle column 304. FIG. 2B illustrates the arrangement of the ink on the paper sheet of the pixel column for which the ink is ejected by the nozzles 306 of the upstream side nozzle column 302 and the pixel column for which the ink is ejected by the nozzles 306 of the downstream side nozzle column 304 in the case that printing is performed in the state that the vibrations in the paper feed direction are generated. As illustrated in the figure, in the ink arranged on the paper sheet, a position in the paper feed direction is shifted.

Also, FIG. 3A is a halftone pattern of a certain density of an image printed in the state without the vibrations illustrated in FIG. 2A, and FIG. 3B is a halftone pattern of the same density of an image printed in the state that the vibrations are generated illustrated in FIG. 2B. In this way, a shift (impact position shift) is generated in an impact position of the ink ejected at the different timings due to the vibrations, and a pattern of the arrangement of the ink is changed. As a result, the density is different between the image printed in the state without the vibrations and the image printed in the state that the vibrations are generated, and belt-like vibration irregularities extending along the paper feed vertical direction are generated.

<Generation of Inter-Module Joint Irregularities>

It is possible that irregularities similar to the vibration irregularities described above are generated also in a joint area of head modules configuring a print head.

Figure 4:
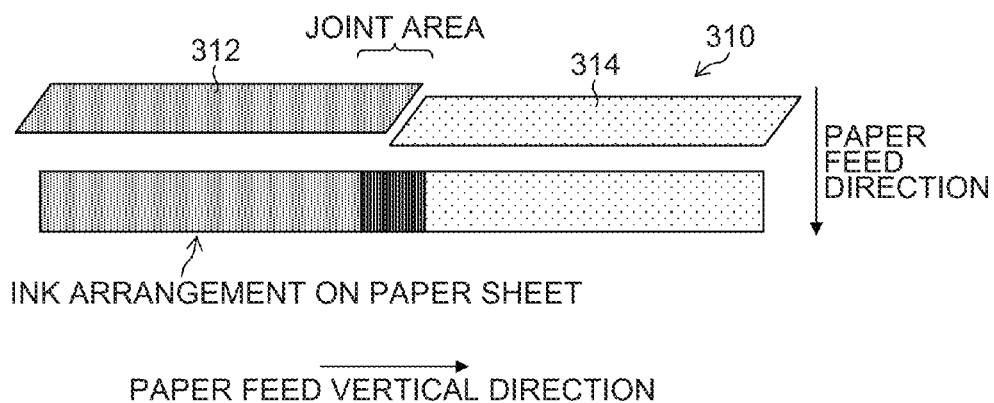
FIG. 4 is a diagram illustrating an arrangement of ink on a paper sheet at an inter-module joint.

FIG. 4 illustrates a print head 310 of the single path system for which a plurality of head modules are alternately shifted in the paper feed direction and lined and arranged in the paper feed vertical direction. Here, a head module 312 and a head module 314 are lined and arranged in the paper feed vertical direction, and also at the joint, the head module 312 and the head module 314 are arranged so as to partially overlap in the paper feed vertical direction. In the joint area (overlap area), at the head module 312 and the head module 314, nozzles (not shown in the figure) are lined and arranged at the interval of two pixels in the paper feed vertical direction respectively and are shifted from each other by one pixel each and arranged in the paper feed vertical direction. Therefore, the nozzles of the head module 312 and the nozzles of the head module 314 are practically alternately arranged by one pixel each along the paper feed vertical direction.

For an image printed by such a print head 310, when focusing on the pixel column lined in the paper feed direction in the joint area, individual pixels are recorded by the same nozzle respectively. Also, when focusing on the pixel column lined in the paper feed vertical direction, a first pixel for which the ink is ejected from the nozzle of the head module 312 at a first timing and a second pixel for which the ink is ejected from the nozzle of the head module 314 at a second timing that is different from the first timing are alternately (cyclically) arranged. That is, the individual pixels of the pixel column along the paper feed vertical direction are deposited at different timings by the plurality of different nozzles. FIG. 4 illustrates the arrangement of the ink on the paper sheet printed by the head module 312 and the head module 314.

Figure 5:
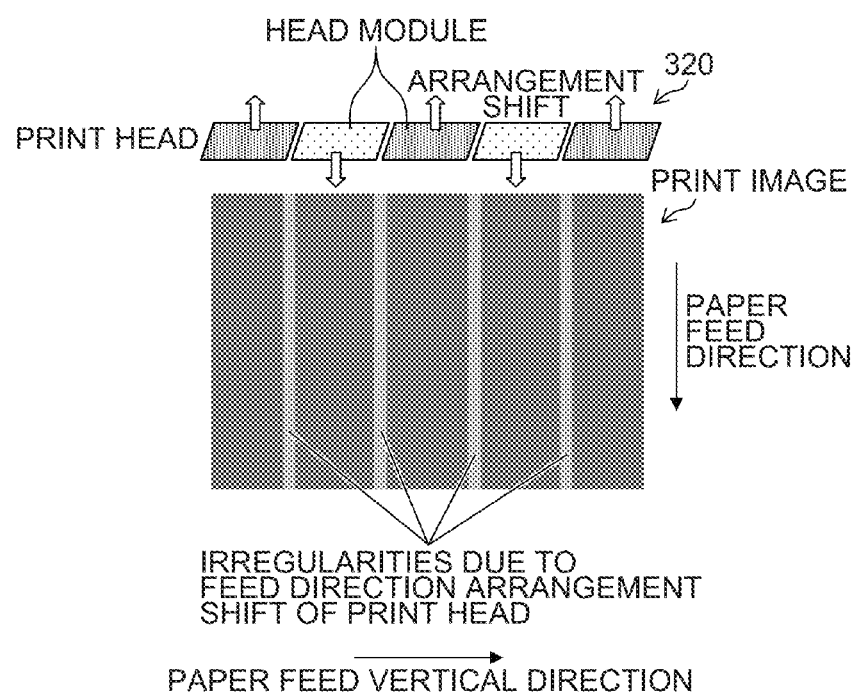
FIG. 5 is a diagram illustrating inter-module joint irregularities.

FIG. 5 illustrates an image (printed image) printed on the paper sheet in the case that the individual head modules are relatively shifted in the paper feed direction from a normal position and arranged (in the case of having an inter-head-module joint shift) in a print head 320 of the single path system for which the plurality of head modules are alternately shifted in the paper feed direction and lined and arranged in the paper feed vertical direction. When the head modules are relatively shifted and arranged in the paper feed direction, in a joint area, a time difference is generated in impacts on the paper sheet of the ink ejected from the nozzles of the head module on the upstream side in the paper feed direction and the ink ejected from the nozzles of the head module on the downstream side in the paper feed direction, and a shift (impact position shift) is generated in a position in the paper feed direction for the ink arranged on the paper sheet (see FIG. 3B). On the other hand, in an area other than the joint area, such a shift is not generated (see FIG. 3A). As a result, a part printed in the joint area of the printed image becomes belt-like inter-module joint irregularities extending along the paper feed direction.

<Cause of Density Fluctuation>

For density fluctuation in the vibration irregularities and the inter-module joint irregularities, what contribution of the dot arrangement most affects the density fluctuation is considered. Here, density contributory components are decomposed into the following three kinds (A)-(C).

Density=(A)+(B)+(C)

Here, it is (A)=single dot effect (~dot density), (B)=combined action of vicinity dots (one to two pixels for example) (~mechanical dot gain), and (C)=interaction of remote dots (three or more pixels for example) (~optical dot gain).

A generated shift amount is assumed to be about one pixel. Regarding the dot density in (A), since the number of dots is not changed when just a recording position is relatively shifted, the dot density is not changed. Therefore, it does not contribute to the density fluctuation.

Also, regarding the interaction of the remote dots in (C), in a pattern for which periodicity is sufficiently dispersed, a positional relation of the remote dots is not changed by the shift of about one pixel. Therefore, it does not contribute to the density fluctuation.

From the above, it is recognized that the interaction of the vicinity dots in (B) most affects the density fluctuation. The vicinity dots are in contact with each other respectively in many cases, and the contact relation largely affects density contribution. Then, when the contact relation is changed by the generation of the impact position shift, it is predicted that the density is to fluctuate.

Figure 6:
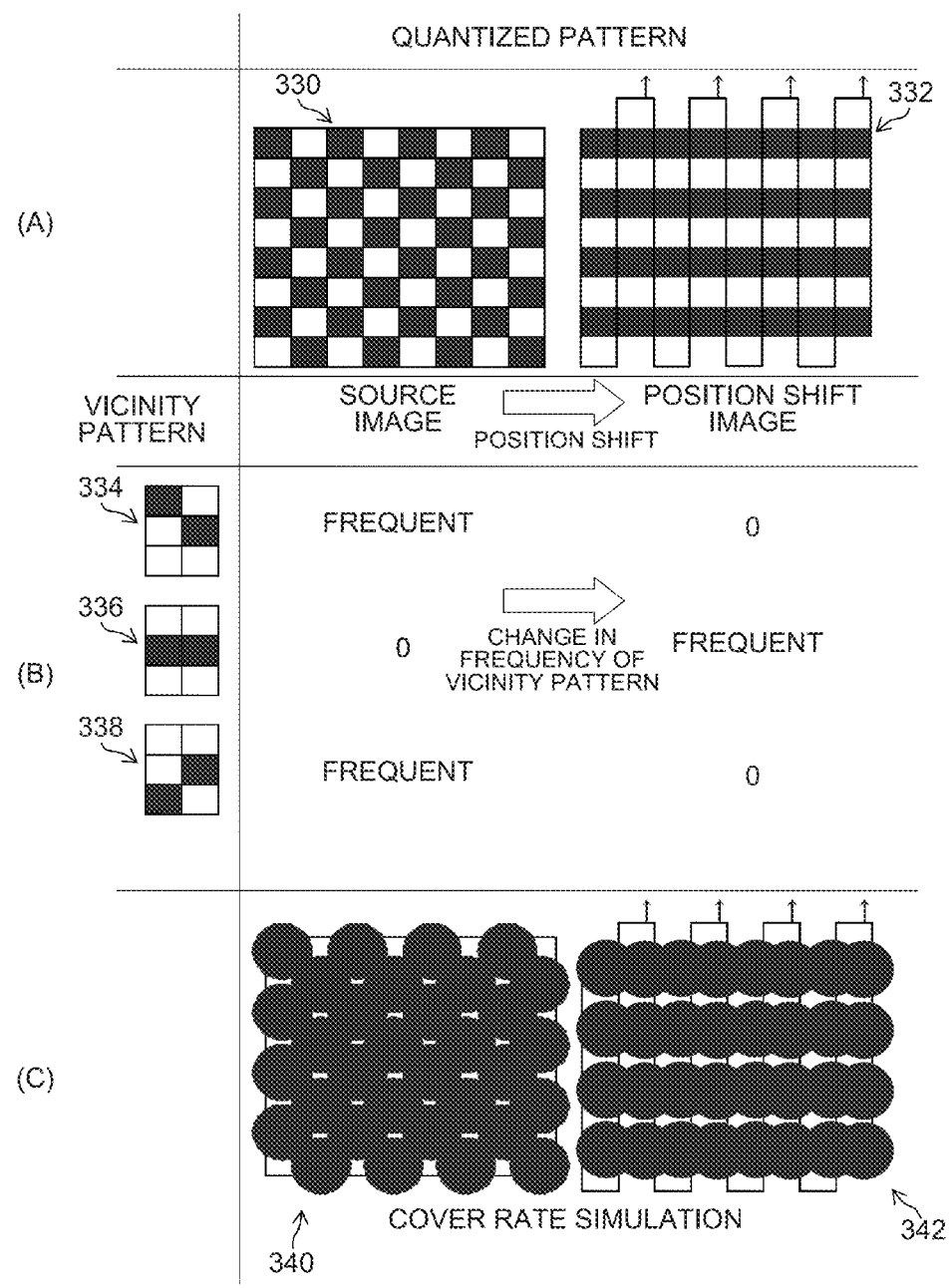
FIG. 6 is a diagram for describing density fluctuation caused by an interaction of vicinity dots.

The interaction of the vicinity dots is described using FIG. 6. Here, as a quantized pattern, a checkered flag pattern is described as an example.

A checkered flag pattern 330 illustrated in portion (A) in FIG. 6 is a source image of a quantized pattern. In the figure, it is assumed that dots can be printed on a square lattice corresponding to a pixel array of a two-dimensional image, a pixel with a dot is indicated by black, and a pixel without a dot is indicated by white. The checkered flag pattern 330 is a dot arrangement in which the pixel with the dot and the pixel without the dot are alternately repeated in a cycle of two pixels respectively in a horizontal direction and a vertical direction.

On the other hand, for a position shift pattern 332 illustrated in portion (A) in FIG. 6, a position shift by one pixel is imparted upwards in the vertical direction in the dot arrangement for every two pixel columns (every two rasters) lined in the vertical direction, to the checkered flag pattern 330 which is the source image. As a result, the position shift pattern 332 is a dot arrangement in which the pixel column formed of the pixels with the dot and the pixel column formed of the pixel without the dot are alternately repeated in the cycle of two pixel columns for the pixel columns in the horizontal direction.

Here, an appearance frequency of a vicinity pattern which is an arrangement pattern of peripheral pixels in the checkered flag pattern 330 and the position shift pattern 332 is considered. Here, as the vicinity pattern, an arrangement pattern formed of the total of six pixels that are two pixels in the horizontal direction and three pixels in the vertical direction is considered.

Portion (B) in FIG. 6 illustrates a vicinity pattern 334, a vicinity pattern 336, and a vicinity pattern 338. The vicinity pattern 334 is a pattern in which a left side upper row pixel and a right side center row pixel in the figure are with the dot, the vicinity pattern 336 is a pattern in which a left side center row pixel and the right side center row pixel in the figure are with the dot, and the vicinity pattern 338 is a pattern in which a left side lower row pixel and the right side center row pixel in the figure are with the dot.

As illustrated in portion (B) in FIG. 6, in the checkered flag pattern 330, the vicinity pattern 334 and the vicinity pattern 338 appear frequently, and the vicinity pattern 336 does not appear. On the other hand, in the position shift pattern 332, the vicinity pattern 336 appears frequently, and the vicinity pattern 334 and the vicinity pattern 338 do not appear. In this way, between the checkered flag pattern 330 and the position shift pattern 332, appearance frequencies of the three vicinity patterns are largely different. In the portion (B) in FIG. 6, it is desirable that frequency is same (Density irregularities are not generated by fluctuation).

Portion (C) in FIG. 6 illustrates simulation images 340 and 342 in which the pixels with the dot indicated by black in the checkered flag pattern 330 and the position shift pattern 332 are replaced with ink dots respectively, in order to simulate a change of the density during printing. As illustrated in the figure, between the simulation image 340 and the simulation image 342, a cover rate (a ratio of an area covered with black) of the paper sheet by the ink dots is largely different, and it is suggested that the difference of the cover rate contributes to the fluctuation of the density.

<Method of Suppressing Density Fluctuation>

In the present embodiment, in the case of recording an image by combining rasters by a plurality of different nozzles in a nozzle column direction, a halftone pattern is controlled so that a statistical appearance frequency of the vicinity pattern which is a main component of a density fluctuation factor in at least some gradations is not changed before and after the generation of the impact position shift of the ink in a nozzle column vertical direction.

The halftone pattern having such a characteristic is described.

First, "vicinity area" is defined. The vicinity area indicates an area where the cover rate fluctuates due to contact of the dots, and is for example an area of vicinity pixels formed of an adjacent pixel adjacent to a certain target pixel (pixel of interest) in the nozzle column direction and a next adjacent pixel successively adjacent to the adjacent pixel in a nozzle column vertical direction. Here, it indicates the area of the vicinity pixels that are the adjacent pixel adjacent to the target pixel in the nozzle column direction and a first next adjacent pixel adjacent to the adjacent pixel in the nozzle column vertical direction.

Figure 7:
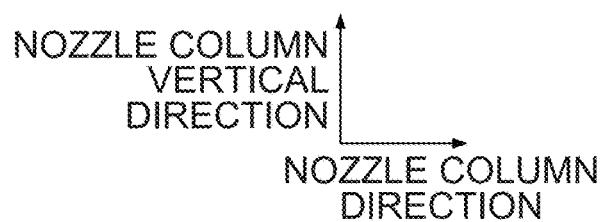
FIG. 7 is a diagram illustrating a positional relation between a target pixel, an adjacent pixel and a next adjacent pixel.

FIG. 7 is a diagram illustrating a positional relation between the target pixel and the adjacent pixel and the next adjacent pixel. In the figure, the target pixel is defined as (0,0), and the individual pixels are indicated by a distance (X,Y) from the target pixel in the individual directions in the case that the nozzle column direction is an X direction and the nozzle column vertical direction is a Y direction. That is, the pixel of (−1,0) and the pixel of (1,0) illustrated in the figure are the adjacent pixels in the X direction, and the pixel of (0,−1) and the pixel of (0,1) are the adjacent pixels in the Y direction. Also, the pixel of (−1,−1), the pixel of (−1,1), the pixel of (1,−1), and the pixel of (1,1) are the next adjacent pixels.

Here, the case that there is an impact position shift of the ink by about one pixel between the pixel columns (rasters) in the nozzle column vertical direction is considered. FIGS. 8A-8E illustrate the change of the positional relation of the pixels in the vicinity area in the case that the ink impact position is shifted between the rasters. In the figure, the vicinity area is surrounded by a broken line and indicated.

FIG. 8A illustrates the state that the ink impact position is not shifted, and FIG. 8B illustrates the state that the shift by −1 pixel is generated in the Y direction in the raster (the raster of X=−1) adjacent on the left side in the figure of the target pixel. Also, FIG. 8C illustrates the state that the shift by +1 pixel is generated in the Y direction in the raster (the raster of X=−1) adjacent on the left side in the figure of the target pixel, FIG. 8D illustrates the state that the shift by −1 pixel is generated in the Y direction in the raster (the raster of X=+1) adjacent on the right side in the figure of the target pixel, and FIG. 8E illustrates the state that the shift by +1 pixel is generated in the Y direction in the raster (the raster of X=+1) adjacent on the right side of the target pixel.

In FIG. 8A, as described above, the pixels of (±1,0) and the pixels of (0,±1) are the adjacent pixels to the target pixel (0,0), and the pixels of (±1,±1) are the next adjacent pixels.

On the other hand, in FIG. 8B, to the target pixel (0,0), the pixels of (−1,1), (1,0), and (0,±1) are the adjacent pixels, and the pixels of (−1,0), (−1,2), and (1,±1) are the next adjacent pixels.

Also, in FIG. 8C, to the target pixel (0,0), the pixels of (−1,−1), (1,0), and (0,±1) are the adjacent pixels, and the pixels of (−1,−2), (−1,0), and (1, ±1) are the next adjacent pixels.

Similarly, in FIG. 8D, to the target pixel (0,0), the pixels of (−1,0), (1,−1), and (0, ±1) are the adjacent pixels, and the pixels of (−1,±1), (1,−2), and (1,0) are the next adjacent pixels. In FIG. 8E, to the target pixel (0,0), the pixels of (−1,0), (1,1), and (0,±1) are the adjacent pixels, and the pixels of (−1,±1), (1,0), and (1,2) are the next adjacent pixels.

Therefore, in five cases illustrated in FIGS. 8A-8E, it is recognized that, when a halftone pattern in which the appearance frequencies of the dots (the dots of the adjacent pixels and the next adjacent pixels to the target pixel) in the vicinity area are uniform can be generated, the positional relation in the vicinity area can be preserved even in the case that the ink impact position is shifted by about one pixel between the rasters in the nozzle column vertical direction.

Note that the halftone pattern in which the appearance frequencies of the dots in the vicinity area are uniform illustrated in FIGS. 8A-8E is equivalent to the halftone pattern in which generation frequencies of 10 kinds of arrangement combinations (the relative positional relation of the two pixels indicated by a black circle and a white circle) illustrated in FIGS. 9A-9J are the same.

In this way, in the halftone pattern according to the present embodiment, the mutual positional correlations between the following two pixels are uniform in at least some gradations.

When it is defined that X=nozzle column direction and Y=nozzle column vertical direction:

(1) The frequency of the pattern formed of the target pixel and the pixel adjacent in the nozzle column direction=the value of X=±1, Y=0 of a positional correlation function, (2) The frequency of the pattern formed of the target pixel and the pixel adjacent in the nozzle column direction and shifted by ±1 pixel in the nozzle column vertical direction=the value of X=±1, Y=±1 of the positional correlation function, (3) The frequency of the pattern formed of the target pixel and the pixel adjacent in the nozzle column direction and shifted by ±2 pixels in the nozzle column vertical direction=the value of X=±1, Y=±2 of the positional correlation function.

According to the halftone pattern, even in the case that the dot arrangement is shifted by about one pixel in the nozzle column vertical direction (the case that the impact position is shifted by about one pixel in the nozzle column vertical direction), the statistical appearance frequency of the vicinity pattern formed of the target pixel, the adjacent pixel (the pixel of ΔX=±1, ΔY=0) and the next adjacent pixel (the pixel of ΔX=±1, ΔY=±1) is not changed. Therefore, even when the individual rasters are shifted in the nozzle column vertical direction and the pattern fluctuates, the statistical appearance frequency of the vicinity pattern that most affects the density fluctuation is not made to fluctuate, and the density fluctuation can be suppressed.

<Halftone Pattern Achieving Method>

Next, a method of achieving the halftone pattern that suppresses the density fluctuation described above is described. In the present embodiment, a quantization step is optimized in at least some gradations, and a quantized pattern is generated in which the dispersion of the generation frequency of the dot arrangement for each relative positional relation between the pixel of interest in the case that the individual pixels within the quantized pattern are successively defined as the pixel of interest and vicinity pixels that are the plurality of vicinity pixels positioned in the vicinity of the pixel of interest and include the adjacent pixel adjacent to the pixel of interest in a second direction and the next adjacent pixel successively adjacent to the adjacent pixel in a first direction is reduced compared to the dispersion before optimization.

For the generation frequency of the dot arrangement, the dispersion of the generation frequency may be reduced for the relative positional relation of the image of one kind of a droplet kind (first kind value) of binary and multivalued halftone images, or the dispersion of the generation frequency may be reduced for the image for which a combination of two kinds of droplet kinds (the first kind value and a second kind value different from the first kind value) is extracted.

As a basic flow, as illustrated in FIG. 10, the quantized pattern of a specific gradation is prepared (step S1, one example of a quantization step), an evaluation value correlated to a positional correlation function component is calculated (step S2), and the quantized pattern is changed on the basis of the calculated evaluation value (step S3, one example of an optimization step). Then, whether or not to end processing is determined (step S4), the processing returns to step S2 in the case of not ending it, and the similar processing is repeated in the changed quantized pattern.

Note that the evaluation value correlated to the positional correlation function component is an amount correlated to the appearance frequency (generation frequency) of the individual arrangement patterns (the relative positional relation of the two pixels) illustrated in FIGS. 9A-9J, and is specifically calculated as follows.

It is defined that i and m are natural numbers, and an m-value quantized image having a droplet kind i satisfying 1≤i≤m is considered. The nozzle column direction is defined as the x direction, the nozzle column vertical direction is defined as the y direction, and the m-value quantized image is defined as $quant\_m(x,y)$.

Of the m-value quantized image, an image $img(i,x,y)$ of the dot of the droplet kind i is defined as $$\begin{aligned}&\text{if } quant\_m(x,y) == i \text{ then,}\\&\quad img(i,x,y) = 1\\&\text{else}\\&\quad img(i,x,y) = 0\\&\text{end if.}\end{aligned}$$

In this case, the positional correlation function (cross-correlation function) of the image of the dot of the droplet kind i (one example of the first kind value) and the image of the dot of a droplet kind j (one example of the second kind value, j is a natural number satisfying 1≤j≤m) can be obtained by the following equation 1.

$$correl(i, j, \Delta x, \Delta y) = \sum_{x,y} img(i, x, y) img(j, x + \Delta x, y + \Delta y) \quad \text{(Equation 1)}$$

Here, correl(i,j,±1,0) indicates the evaluation value of the dot arrangement of the target pixel and the adjacent pixel adjacent (x=±1, y=0) in the nozzle column direction, and corresponds to the evaluation value of the frequency of the arrangement combinations of the dot of the droplet kind i and the dot of the droplet kind j illustrated in FIGS. 11A and 11B.

Also, correl(i,j,±1,±1) indicates the evaluation value of the arrangement of the target pixel and the first next adjacent pixel adjacent (x=±1) in the nozzle column direction and shifted by ±1 pixel (y=±1) in the nozzle column vertical direction, and corresponds to the evaluation value of the frequency of the arrangement combinations of the dot of the droplet kind i and the dot of the droplet kind j illustrated in FIGS. 11C, 11D, 11E and 11F respectively.

Further, correl(i,j,±1,±2) indicates the evaluation value of the arrangement of the target pixel and the second next adjacent pixel adjacent (x=±1) in the nozzle column direction and shifted by ±2 pixels (y=±2) in the nozzle column vertical direction, and corresponds to the evaluation value of the frequency of the arrangement combinations of the dot of the droplet kind i and the dot of the droplet kind j illustrated in FIGS. 11G, 11H, 11I and 11J respectively.

The evaluation values of these 10 kinds of the arrangement combinations are obtained, and the pattern is changed so that the individual evaluation values become uniform.

<Optimization of Error Diffusion Coefficient>

Next, a control method of uniformizing the evaluation values described above is described. First, the case of performing quantization using an error diffusion method is described. In the case of using the error diffusion method, by optimizing an error diffusion coefficient, the generated halftone pattern is made to have a characteristic of being capable of suppressing the density fluctuation.

Figure 12:
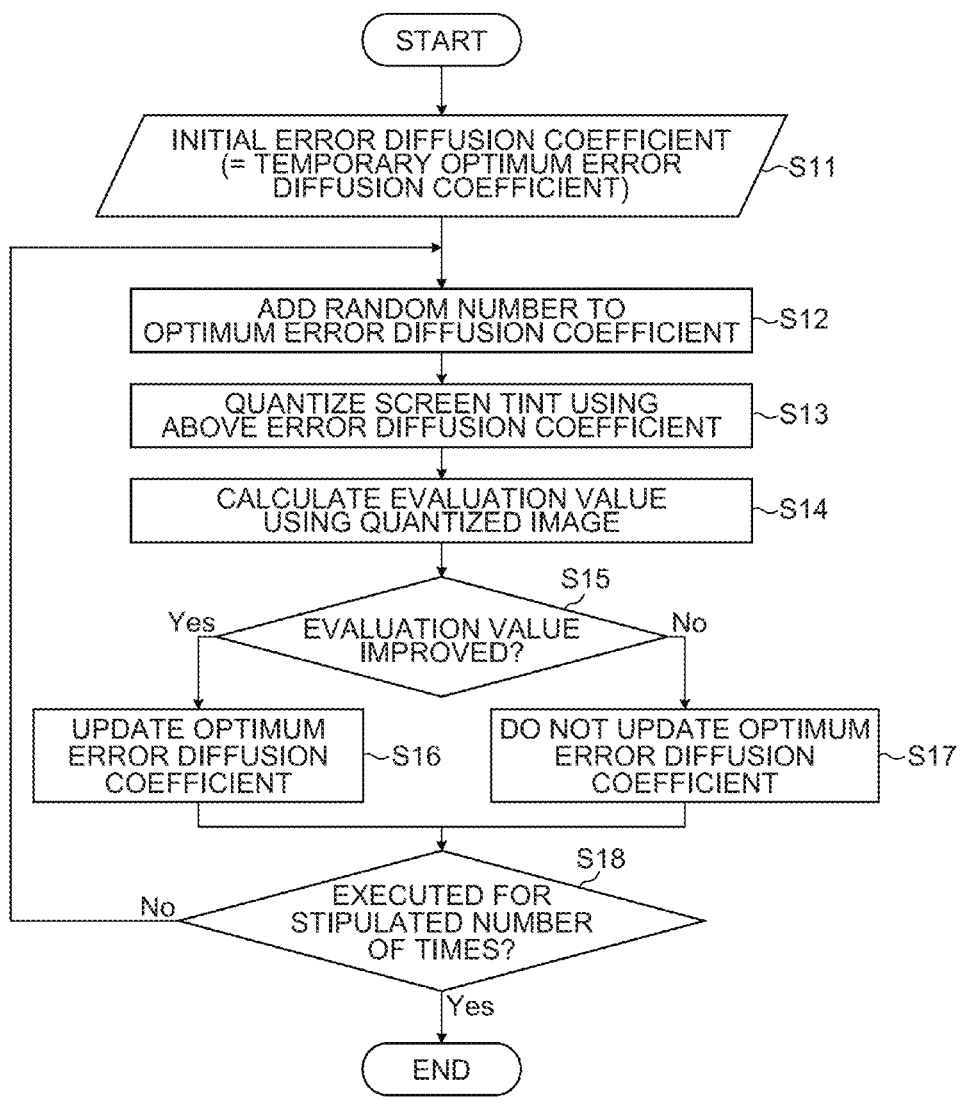
FIG. 12 is a flowchart illustrating processing of an optimization method of an error diffusion coefficient.

In an optimization method of the error diffusion coefficient, as illustrated in FIG. 12, an initial error diffusion coefficient is set as a temporary optimum error diffusion coefficient (step S11).

Next, a random number is added to the optimum error diffusion coefficient (step S12), and the error diffusion coefficient to which the random number is added (one example of the temporary error diffusion coefficient) is used to quantize a screen tint image (a solid image of an intermediate gradation) and generate an evaluation pattern (step S13, an evaluation pattern generation step). Subsequently, the quantized image which is this evaluation pattern is used to calculate the evaluation value (step S14, one example of an evaluation value calculation step).

Then, whether or not the evaluation value is improved relative to the evaluation value of the optimum error diffusion coefficient (corresponding to the dispersion before optimization) is determined (step S15, one example of a determination step), the error diffusion coefficient to which the random number is added in step S12 is updated as a new optimum error diffusion coefficient in the case that it is improved (step S16, one example of a change step, one example of an updating step), and the optimum error diffusion coefficient is not updated in the case that it is not improved (step S17).

Whether or not this processing is executed for a stipulated number of times set beforehand is determined (step S18), and in the case that the stipulated number of times is not reached, the similar processing is repeated returning to step S12. In the case that the processing is executed for the stipulated number of times, the processing is ended.

Here, one example of an evaluation function when calculating the evaluation value (one example of an optimum determination evaluation value) in step S14 (one example of an optimum determination evaluation value calculation step) is indicated in the following equation 2.

$$\text{eval\_band} = \sum_{i,j} c_{ij} \sum_{|\Delta x|=1, |\Delta y| \le 2} \left( correl(i, j, \Delta x, \Delta y) - \left( \sum_{|\Delta x'|=1, |\Delta y'| \le 2} correl(i, j, \Delta x', \Delta y')/10 \right) \right)^2 \quad \text{(Equation 2)}$$

Note that $c_{ij}$ is a weighting coefficient that satisfies $c_{ij} > 0$.

For the equation 2, the dispersion of the correlation function components of the 10 kinds of the arrangement combinations of the dot of the droplet kind i and the dot of the droplet kind j illustrated in FIGS. 11A-11J, that is, a difference from the average value of the correlation function components of the target pixel and the adjacent pixel and the next adjacent pixel, is added for each arrangement combination of the dot of the droplet kind i and the dot of the droplet kind j. Therefore, as the value of this eval_band is smaller, the dispersion of the generation frequencies of the individual vicinity patterns is small, and the density fluctuation can be suppressed even when the impact position is shifted. Therefore, improvement of the evaluation value in step S15 indicates that the value of the eval_band becomes small compared to the eval_band for the error diffusion coefficient before the random number is added.

Note that, in terms of a property of the correlation function, correl(i,j,x,y)=correl(j,i,-x,-y) is satisfied. Using the relation, the combinations of the addition of the evaluation function (the combinations of {i,j} for example) may be reduced. Also, regarding the arrangement combination of the dot of the droplet kind for which the contribution is considered to be small or the like, the contribution may be changed by making the value of the weighting coefficient $c_{ij}$ relatively small.

By performing quantization using the error diffusion coefficient optimized in this way, the density fluctuation can be suppressed.

[Case with Bilateral Symmetry]

In addition, there exists a case that the combination of the dispersion of the correlation function components of the arrangement of the dot of the droplet kind i and the dot of the droplet kind j to be added to eval_band can be omitted from physical examinations.

Figure 13:
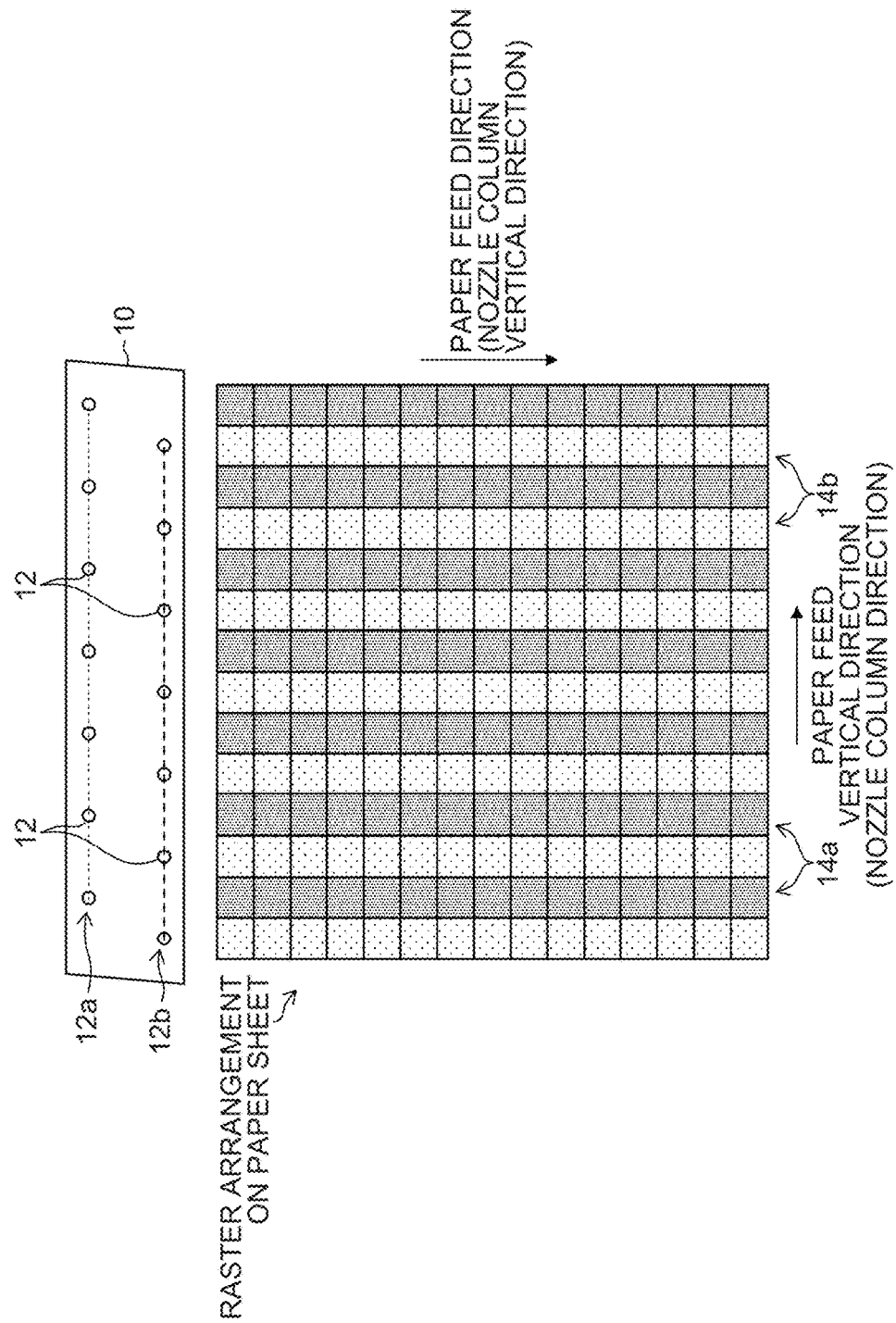
FIG. 13 is a diagram illustrating an arrangement of a two-dimensional print head 10 and rasters formed by the two-dimensional print head 10.

A two-dimensional print head 10 illustrated in FIG. 13 includes a two-dimensional nozzle array (one example of a recording element array) for which a plurality of columns of a nozzle column 12a (one example of the recording element column) and a nozzle column 12b with a plurality of nozzles 12 (one example of the recording elements) arrayed in the paper feed vertical direction (nozzle column direction) are arranged in the paper feed direction (nozzle column vertical direction). The individual nozzles 12 of the nozzle column 12a and the nozzle column 12b are lined and arranged at the interval of two pixels in the paper feed vertical direction respectively, and also shifted by one pixel each from each other and arranged in the paper feed vertical direction. Therefore, the nozzles 12 of the nozzle column 12a and the nozzles 12 of the nozzle column 12b are alternately arranged practically by one pixel each along the paper feed vertical direction.

In the case of printing an image on a paper sheet while relatively moving the two-dimensional print head 10 configured in this way and the paper sheet (not shown in FIG. 13) in the paper feed direction, when focusing on the rasters lined in the paper feed direction of the printed image, the rasters where the ink is ejected from the nozzles 12 of the nozzle column 12a and the rasters where the ink is ejected from the nozzles 12 of the nozzle column 12b are provided. That is, the individual pixels of the raster along the paper feed direction are printed by the same nozzle respectively.

Also, when focusing on the pixel column lined in the paper feed vertical direction, the pixels for which the ink is ejected from the nozzles 12 of the nozzle column 12a on the upstream side at a first timing and the pixels for which the ink is ejected from the nozzles 12 of the nozzle column 12b on the downstream side at a second timing different from the first timing are alternately arranged pixel by pixel. That is, for the pixel column along the paper feed vertical direction, the rasters by the different nozzles are combined.

In FIG. 13, individual cells of an image lattice indicated by a square lattice correspond to the pixels, and rasters 14a where the ink is ejected from the nozzle column 12a and rasters 14b where the ink is ejected from the nozzle column 12b are illustrated.

In the case that the vibration shift is generated in the two-dimensional print head 10 configured in this way, the impact position shift of the ink is generated in linkage in the rasters 14a with each other and the rasters 14b with each other. Also, when viewing from one raster, the other rasters surely exist on both sides in the nozzle column direction. That is, there is symmetry in the paper feed vertical direction for the rasters.

In such a case, it can be said that there is the following relation regarding the density contribution.

The density contribution of correl(i,j,x,y) the density contribution of correl(i,j,−x,y)

For example, the density contribution in the arrangement combination of the dot of the droplet kind i and the dot of the droplet kind j illustrated in FIG. 11A and the density contribution in the arrangement combination of the dot of the droplet kind i and the dot of the droplet kind j illustrated in FIG. 11B are equal. Similarly, the density contribution in the arrangement combination of the dot of the droplet kind i and the dot of the droplet kind j illustrated in FIG. 11C and the density contribution in the arrangement combination of the dot of the droplet kind i and the dot of the droplet kind j illustrated in FIG. 11D are equal.

In consideration of such a characteristic, it is also possible to change the evaluation function. One example of the evaluation function when calculating the evaluation value in the case that there is the bilateral symmetry is indicated in the following equation 3.

$$\text{eval\_band} = \sum_{i,j} c_{ij} \sum_{\Delta x=1, |\Delta y| \leq 2} \left( correl(i, j, \Delta x, \Delta y) + correl(i, j, -\Delta x, \Delta y) - \left( \sum_{\Delta x'=1, |\Delta y'|<2} (correl(i, j, \Delta x', \Delta y') + correl(i, j, -\Delta x', \Delta y'))/5 \right) \right)^2$$

(Equation 3)

[Case of Considering Low Frequency Noise and Graininess]

As described above, in the case of using the evaluation function paying attention only to the suppression of the density fluctuation, the halftone pattern that deteriorates graininess of the image or generates low frequency noise is sometimes selected as the optimum value. For such a problem, as indicated in the following equation 4, a configuration in which the evaluation function is the function of the density fluctuation suppression and the low frequency noise and the graininess is also possible.

$$\text{eval\_total} = f(\text{eval\_band}, \text{eval\_graininess}) \qquad \text{(Equation 4)}$$

As a form of the function, it is also possible to simply take a product for example.

$$\text{eval\_total} = \text{eval\_band} * \text{eval\_graininess} \qquad \text{(Equation 5)}$$

Also, regarding the evaluation function of the low frequency noise and the graininess, the following configuration is possible for example.

$$\text{eval\_graininess} = \sum_{k_x, k_y} \text{quant\_m}(k_x, k_y) \text{filter}(k_x, k_y) \qquad \text{(Equation 6)}$$

Here, quant_m($k_x$,$k_y$)=fft(quant_m(x,y)), fft indicates Fourier series expansion. Also, filter is a frequency filter, and it is desirable that it is a high-pass filter. In particular, it is preferable that it is the one in which a frequency lower than a frequency (5 cycle/mm for example) visually recognized with eyes of a human is emphasized.

From this, the evaluation value correlated to the low frequency noise and the graininess can be included in the optimum determination evaluation value, and therefore, the halftone pattern that deteriorates the graininess of the image or generate the low frequency noise can be prevented from being selected as the optimum value.

<Error Diffusion Coefficient Generator>

Figure 14:
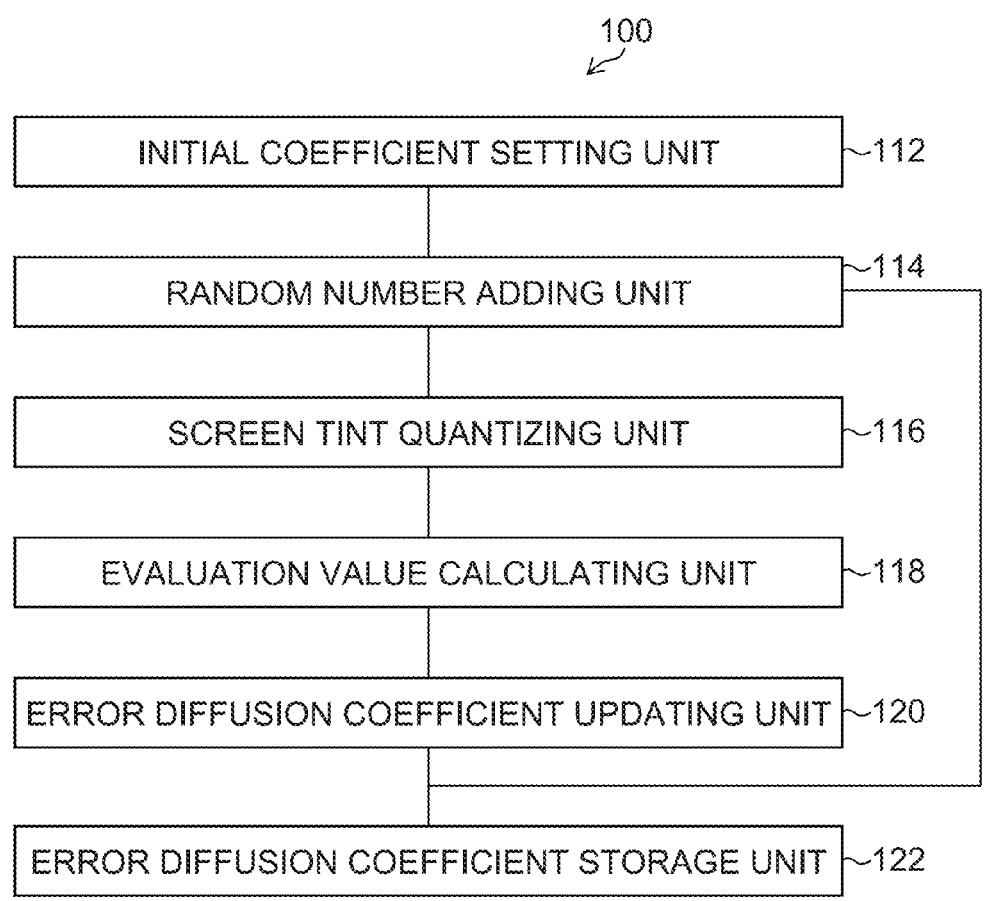
FIG. 14 is a block diagram of an error diffusion coefficient generator.

An error diffusion coefficient generator 100 that optimizes the error diffusion coefficient as described above is described. As illustrated in FIG. 14, the error diffusion coefficient generator 100 (one example of an optimization device) includes an initial coefficient setting unit 112, a random number adding unit 114, a screen tint quantizing unit 116, an evaluation value calculating unit 118, an error diffusion coefficient updating unit 120, and an error diffusion coefficient storage unit 122.

The initial coefficient setting unit 112 sets an initial error diffusion coefficient which is a temporary optimum error diffusion coefficient. The random number adding unit 114 adds a random number to the optimum error diffusion coefficient. The screen tint quantizing unit 116 quantizes a screen tint image using the error diffusion coefficient to which the random number is added.

The evaluation value calculating unit 118 calculates the evaluation value (eval_band indicated in the equation 2 for example) of the quantized image of the screen tint image. The error diffusion coefficient updating unit 120 determines whether or not the evaluation value calculated by the evaluation value calculating unit 118 is improved relative to the evaluation value of the optimum error diffusion coefficient, and in the case that it is improved, updates the error diffusion coefficient to which the random number is added as a new optimum error diffusion coefficient. The error diffusion coefficient storage unit 122 stores the optimum error diffusion coefficient.

<Image Processor by Error Diffusion Method>

Figure 15:
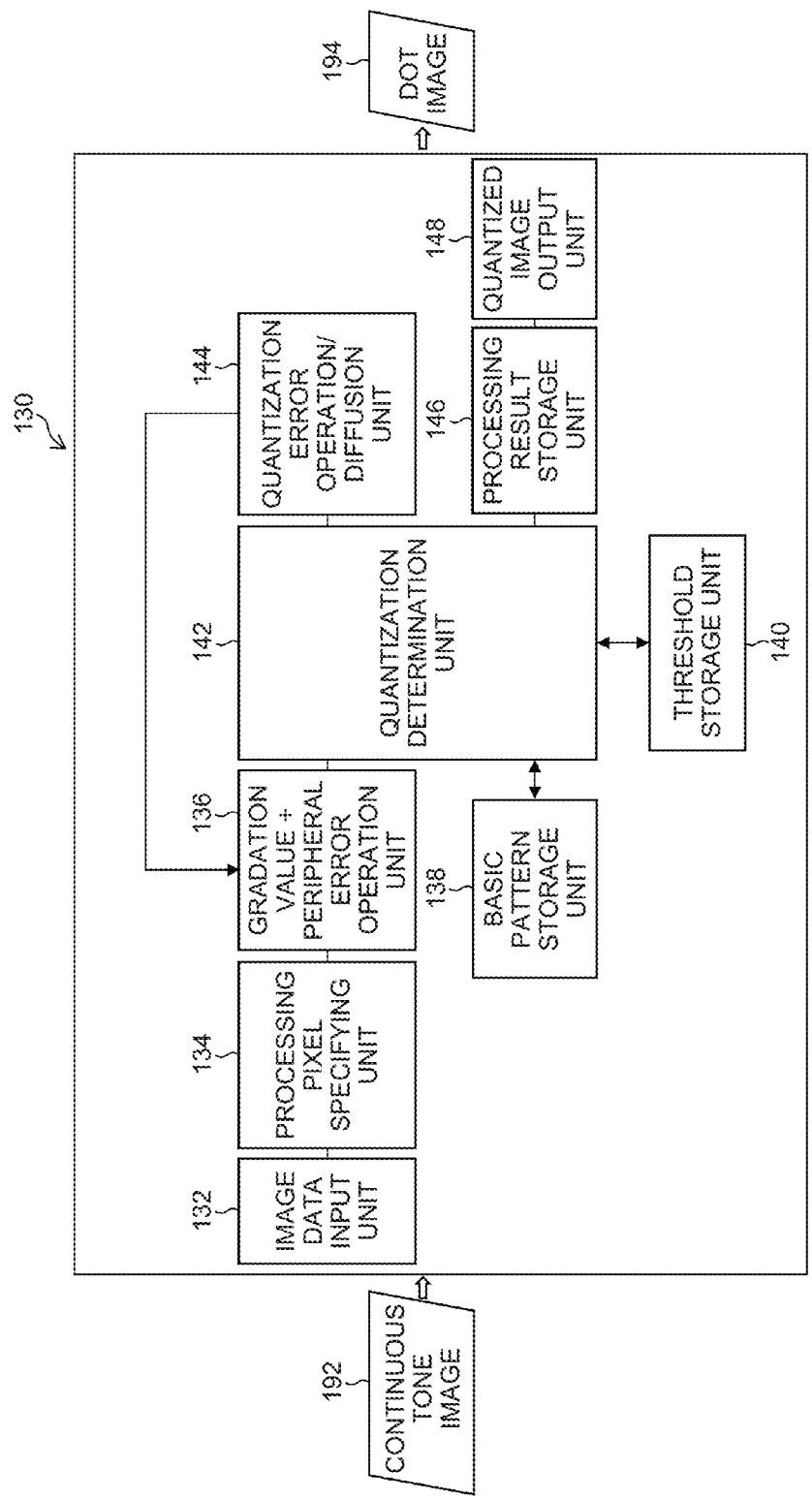
FIG. 15 is a block diagram of an image processor that uses an error diffusion method.

An image processor that quantizes continuous tone images (input image) using the error diffusion coefficient optimized as described above is described. As illustrated in FIG. 15, an image processor 130 includes an image data input unit 132, a processing pixel specifying unit 134, an operation unit 136 (described as "gradation value+peripheral error operation unit" in FIG. 15), a basic pattern storage unit 138, a threshold storage unit 140, a quantization determination unit 142, a quantization error operation/diffusion unit 144, a processing result storage unit 146, and a quantized image output unit 148.

To the image data input unit 132 (one example of an image acquisition device), continuous tone image data 192 (one example of first image data) for performing quantization is inputted. The image data input unit 132 can be configured by a data input terminal that fetches image data from another signal processing unit outside or inside the processor. Also, a cable or wireless communication interface unit may be adopted, a medium interface unit that performs read and write of an external storage medium (removable disk) such as a memory card may be adopted, or it may be an appropriate combination of these forms.

The processing pixel specifying unit 134 specifies a pixel (processing pixel) to be a target of quantization processing in inputted image data. The operation unit 136 adds a gradation value of the processing pixel and a cumulative value of quantization errors diffused from peripheral quantized pixels.

The basic pattern storage unit 138 stores data of a basic pattern to be utilized for a restriction condition of the dot arrangement. Also, the threshold storage unit 140 stores the optimum error diffusion coefficient according to the present embodiment.

The quantization determination unit 142 compares the value obtained from the operation unit 136 with a threshold for quantization determination (also called "a threshold for error diffusion"), and quantizes a pixel value so as to satisfy the restriction condition of the basic pattern further. The quantization error operation/diffusion unit 144 calculates the quantization error and diffuses it to unprocessed pixels around the processing pixel.

The processing result storage unit 146 stores a quantization result. The quantized image output unit 148 is an output unit that outputs a dot image 194 (one example of second image data) of the quantized pattern generated by the quantization processing. The quantized image output unit 148 may be in various kinds of forms such as a communication interface, a medium interface that reads an external storage medium such as a memory card, or an output terminal of image signals.

Figure 16:
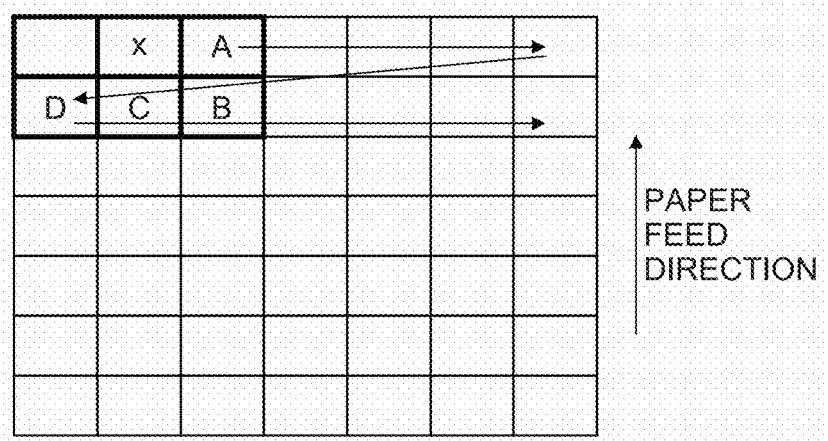
FIG. 16 is a diagram illustrating one example of an error diffusion matrix.

FIG. 16 is an example of an error diffusion matrix used in the quantization error operation/diffusion unit 144. Reference character "x" in the figure designates a position of a quantization target pixel, and arrows indicate a processing order of the quantization processing. To the four unprocessed pixels (at the right side, lower right, directly below (right below), and lower left) adjacent to the pixel of interest (the quantization target pixel x), the quantization error is distributed respectively. Error diffusion coefficients A-D that stipulate a distribution ratio of the error are optimized by the present embodiment, and are stored in the threshold storage unit 140.

In the present embodiment, the processing pixel specifying unit 134, the operation unit 136, the basic pattern storage unit 138, the threshold storage unit 140, the quantization determination unit 142, the quantization error operation/diffusion unit 144, and the processing result storage unit 146 correspond to "the quantization device".

<Optimization of Threshold Matrix>

Next, a control method of uniformizing the evaluation value in the case of performing quantization using a threshold matrix is described. Here, by attaining the threshold matrix for which a pattern that is binarized or multivalued by a specified threshold is optimized, the halftone pattern generated using the threshold matrix is provided with the characteristic of being capable of suppressing the density fluctuation.

Figure 17:
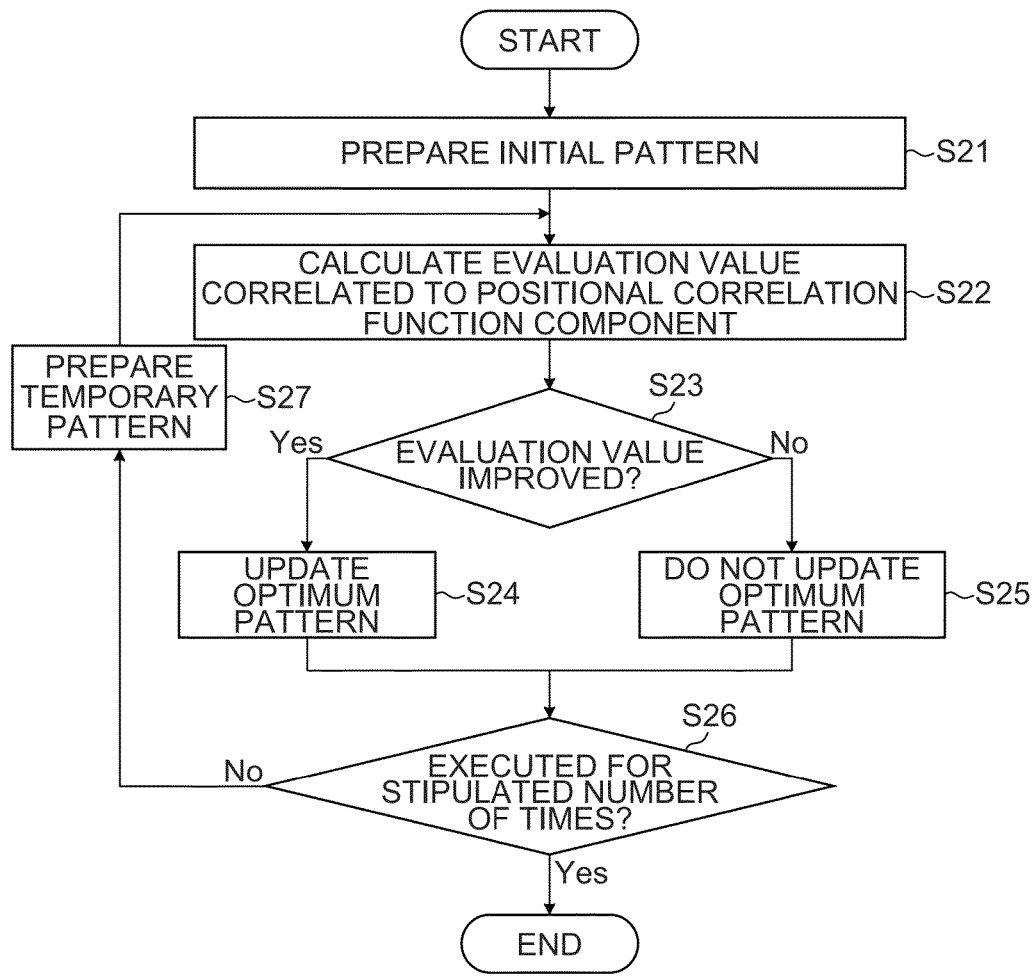
FIG. 17 is a flowchart illustrating processing of an optimization method of a threshold matrix.

In an optimization method of the threshold matrix, as illustrated in FIG. 17, an initial pattern is prepared as a temporary pattern first (step S21).

Next, the evaluation value correlated to the positional correlation function component of the pattern binarized or multivalued by the specific threshold for the temporary pattern is calculated (step S22, one example of the evaluation value calculation step), and whether or not the evaluation value is improved relative to the previous evaluation value (the evaluation value in the optimum pattern, corresponding to the dispersion before the optimization) is determined (step S23, one example of the determination step). In the case that it is improved, this pattern is updated as the optimum pattern (step S24, one example of the change step, one example of the updating step), and in the case that it is not improved, the optimum pattern is not updated (step S25).

Whether or not this processing is executed for the stipulated number of times set beforehand is determined (step S26), and in the case that the stipulated number of times is not reached, a new temporary pattern different from the pattern for which the evaluation value is calculated is prepared (step S27), and the similar processing is repeated returning to step S22. In the case that the processing is executed for the stipulated number of times, the optimum pattern at the point of time is defined as the optimum threshold matrix, and the processing is ended.

Similarly to the case of the error diffusion method, the evaluation value correlated to the positional correlation function component can be calculated using the equation 2 and the equation 3.

By performing the quantization using the threshold matrix optimized in this way, the density fluctuation can be suppressed.

[Temporary Pattern Preparation Using Evaluation Value]

When preparing the temporary pattern in step S27, the configuration of feeding back and using the evaluation value calculated in step S22 is also possible. Here, an example of narrowing down candidates of a change pixel by using the evaluation value is described.

Figure 18:
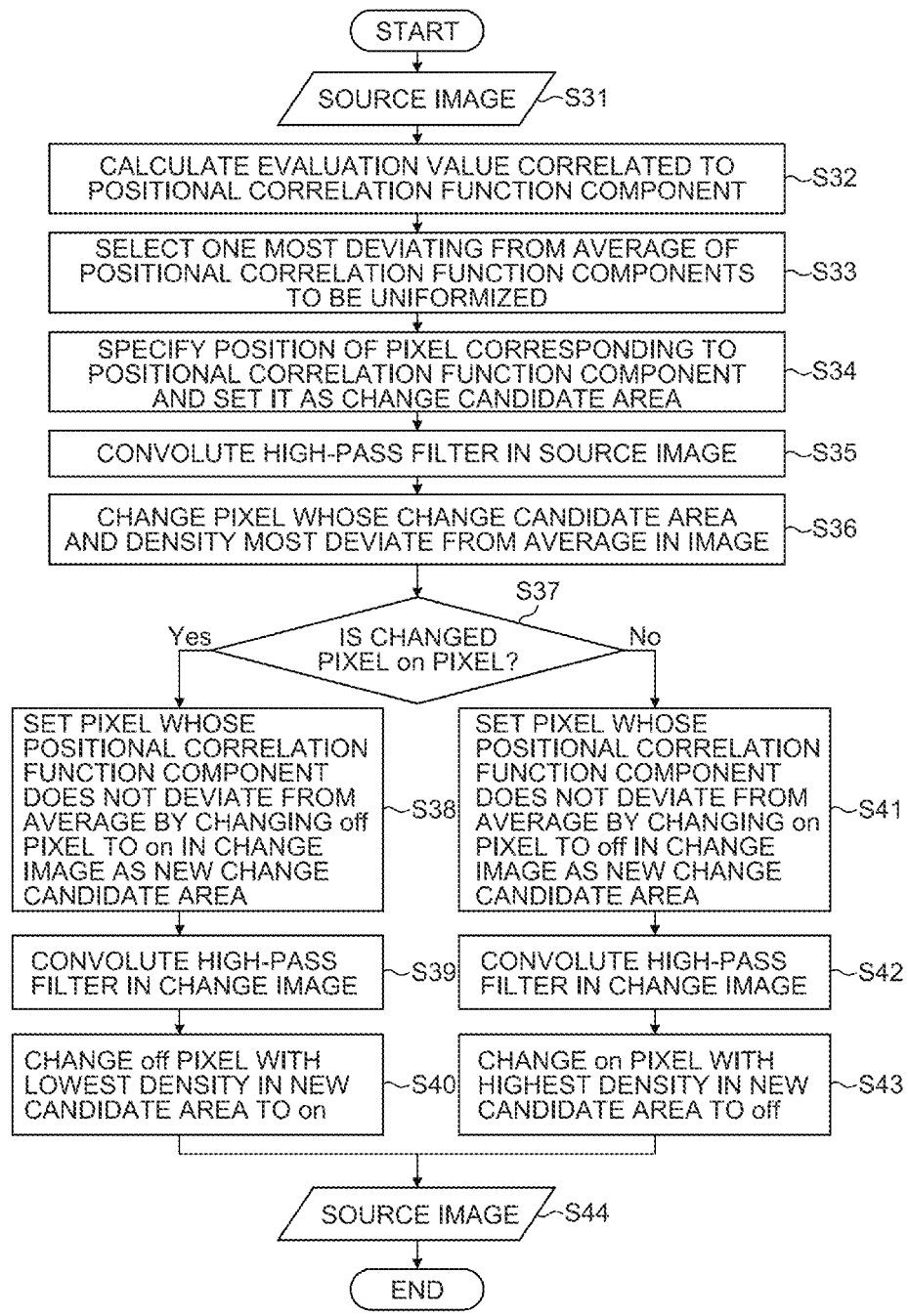
FIG. 18 is a flowchart illustrating preparation processing of a temporary pattern.

In preparation processing of this temporary pattern, as illustrated in FIG. 18, a source image is acquired first (step S31). Here, the current optimum pattern is used as the source image.

Next, the evaluation value of the positional correlation function component of the pattern for which the optimum pattern is binarized or multivalued by the specific threshold is calculated (step S32). Here, the plurality of evaluation values for each relative positional relation are calculated. The evaluation value calculated in step S22 may be stored, and the stored evaluation value may be read.

Next, of the positional correlation function components to be uniformized, the one most deviating from the average is selected (step S33). Here, of the plurality of evaluation values calculated in step S32, the evaluation value with the largest difference from the average value of the plurality of evaluation values (one example of the evaluation value with a relatively large difference) is selected. That is, of the evaluation values of the 10 kinds of the arrangement combinations of the dot of the droplet kind i and the dot of the droplet kind j illustrated in FIGS. 11A-11J, the evaluation value of the combination of the highest appearance frequency or the lowest appearance frequency is selected by comparing the respective correlation function components correl(i,j,Δx, Δy) and the average. Also, the position of the pixel of the arrangement combination corresponding to the selected evaluation value is specified, and set as a change candidate area (step S34).

Subsequently, the high-pass filter is convoluted to the source image (the pattern for which the optimum pattern is binarized or multivalued by the specified threshold) (step S35). Thus, conversion is performed to the image for which frequency components of the dot arrangement within the source image are expressed by light and shade. Further, in the image in which the high-pass filter is convoluted, the pixel which is included in the change candidate area set in step S34 and whose density is most deviating from the average (the pixel with the highest or lowest dot density) is changed to the pixel without the dot when it is the pixel with the dot (called an on pixel here), and is changed to the pixel with the dot when it is the pixel without the dot (called an off pixel here) (step S36).

Next, whether or not the pixel changed in step S36 is the on pixel (is changed and turned to the off pixel) is determined (step S37). In the case that the changed pixel is the on pixel (in the case that the on pixel is changed to the off pixel), the processing shifts to step S38, and in the case that the changed pixel is the off pixel (in the case that the off pixel is changed to the on pixel), the processing shifts to step S41.

In the case that the changed pixel is the on pixel, in the image after the pixel is changed, the pixel for which the positional correlation function component does not deviate from the average even when the off pixel is changed to the on pixel is set as a new change candidate area (step S38).

Further, the high-pass filter is convoluted to the image after the pixel is changed (step S39), and the conversion is performed to the image for which the frequency components of the dot arrangement within the image after the pixel is changed are expressed by light and shade. Then, by changing the off pixel which is included in the new change candidate area set in step S38 and is of the lowest density to the on pixel (step S40), a changed image is prepared (step S44).

On the other hand, in the case that the changed pixel is the off pixel, in the image after the pixel is changed, the pixel for which the positional correlation function component does not deviate from the average even when the on pixel is changed to the off pixel is set as a new change candidate area (step S41).

Further, the high-pass filter is convoluted to the image after the change (step S42), and the conversion is performed to the image for which the frequency components of the dot arrangement within the image after the pixel is changed are expressed by light and shade. Then, by changing the on pixel which is included in the new change candidate area set in step S41 and is of the highest density to the off pixel (step S43), a changed image is prepared (step S44).

Since the changed image is the pattern binarized or multivalued by the specific threshold, the threshold matrix is generated from the changed image on the basis of the threshold matrix which is the source image, and the optimum pattern is updated.

In this way, the calculated evaluation values are used, and the dot (or a void) is selected from an image area corresponding to the one most deviating from the average among the positional correlation function components, and is moved to a location where the positional correlation function component does not increase (decrease) in consideration of uniformity of the density. As a result, since the one deviating from the average among the positional correlation function components gets closer to the average, the irregularities due to the density fluctuation can be reduced, and the graininess can be also improved.

<Threshold Matrix Generator>

Figure 19:
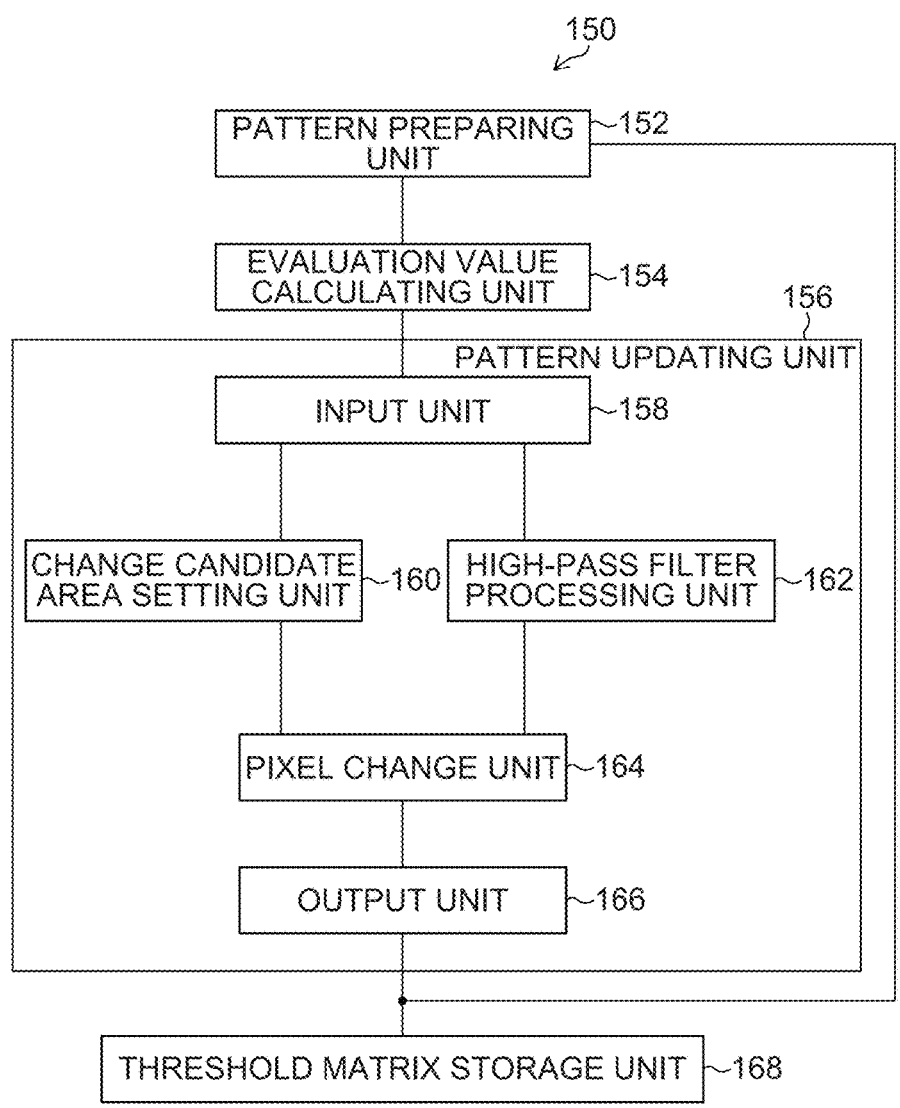
FIG. 19 is a block diagram of a threshold matrix generator.

A threshold matrix generator 150 that optimizes the threshold matrix as described above is described. As illustrated in FIG. 19, the threshold matrix generator 150 (one example of the optimization device) includes a pattern preparing unit 152, an evaluation value calculating unit 154, a pattern updating unit 156, and a threshold matrix storage unit 168.

Also, the pattern updating unit 156 includes an input unit 158, a change candidate area setting unit 160, a high-pass filter processing unit 162, a pixel change unit 164, and an output unit 166.

The pattern preparing unit 152 prepares the temporary pattern described above. The evaluation value calculating unit 154 calculates the evaluation value correlated to the positional correlation function component of the temporary pattern.

The pattern updating unit 156 updates the optimum pattern according to the evaluation value calculated by the evaluation value calculating unit 154. The input unit 158 acquires the source image which is the current optimum pattern.

The change candidate area setting unit 160 sets the change candidate area and the new change candidate area described above. The high-pass filter processing unit 162 performs the processing of convoluting the high-pass filter to the source image and the pixel change image.

The pixel change unit 164 changes the pixel which is included in the change candidate area and whose density is most deviating from the average in the image for which the high-pass filter is convoluted in the source image. Also, the pixel change unit 164 changes the off pixel which is included in the new change candidate area and is of the lowest density to the on pixel or changes the on pixel of the highest density to the off pixel, in the image for which the high-pass filter is convoluted in the image after the pixel is changed.

The output unit 166 prepares and outputs the changed image which is a new temporary pattern. The threshold matrix storage unit 168 stores the optimized threshold matrix which is the final optimum pattern.

<Image Processor by Threshold Matrix>

Figure 20:
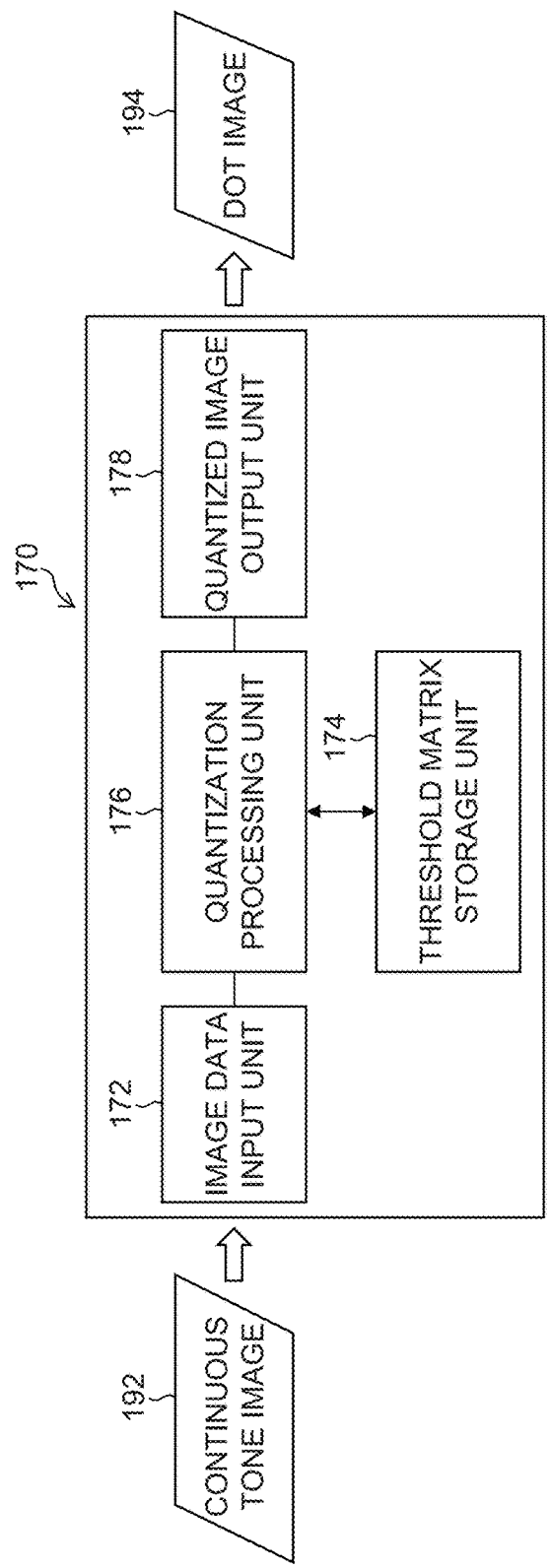
FIG. 20 is a block diagram of an image processor that uses the threshold matrix.

An image processor that quantizes continuous tone images using the threshold matrix optimized as described above is described. As illustrated in FIG. 20, an image processor 170 includes an image data input unit 172, a threshold matrix storage unit 174, a quantization processing unit 176, and a quantized image output unit 178.

To the image data input unit 172 (one example of the image acquisition device), the continuous tone image data 192 for performing the quantization is inputted. In the threshold matrix storage unit 174, data of the threshold matrix optimized by the present embodiment is stored. The quantization processing unit 176 quantizes the input image by referring to the threshold matrix stored in the threshold matrix storage unit 174.

The quantized image output unit 178 is an output unit that outputs the dot image 194 of the quantized pattern generated in the quantization processing unit 176.

In the present embodiment, the quantization processing unit 176 and the threshold matrix storage unit 174 correspond to "the quantization device".

<Quantization Using Error Diffusion Method and Threshold Matrix Together>

Figure 21:
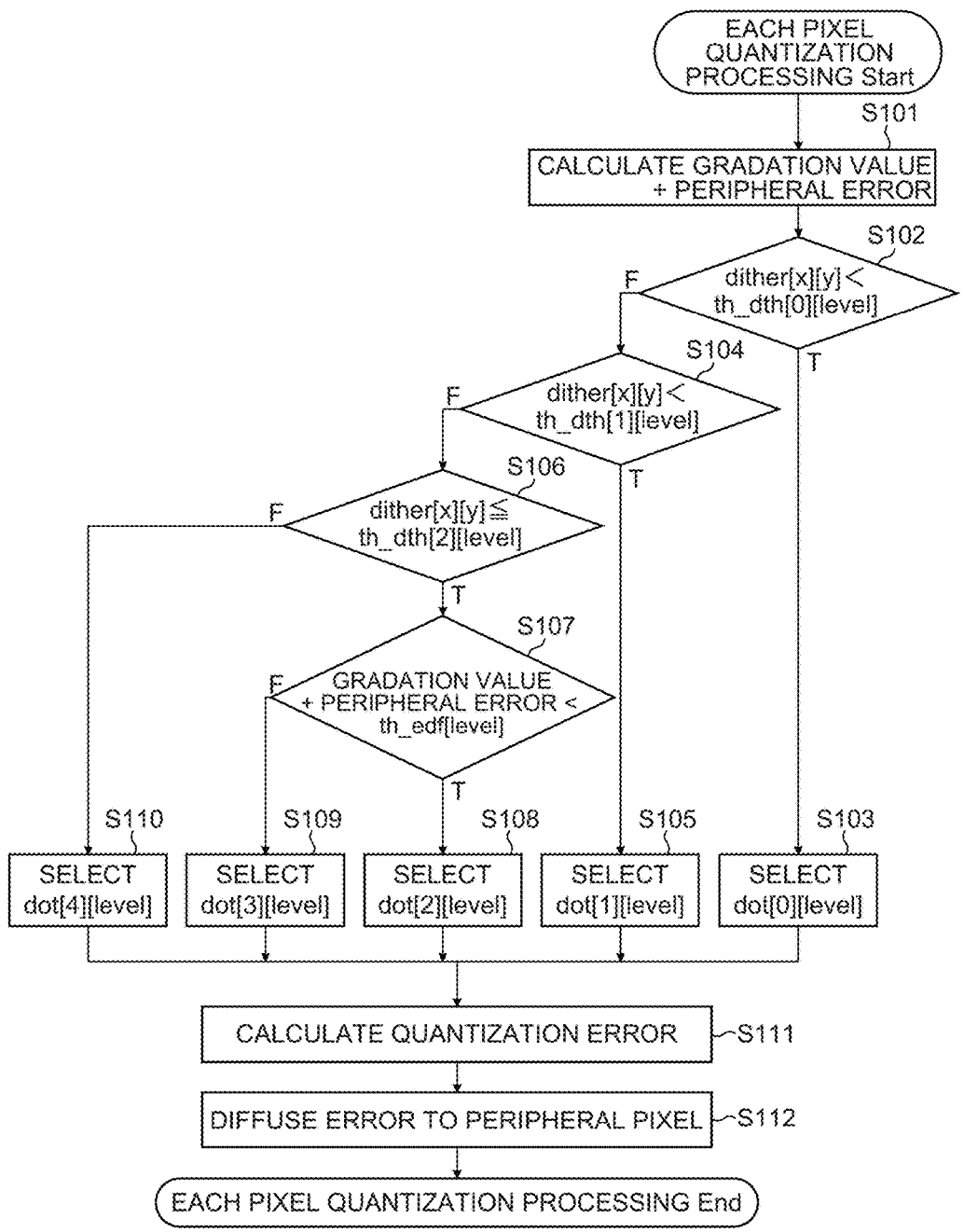
FIG. 21 is a flowchart illustrating quantization processing using the error diffusion method and the threshold matrix together.

Quantization processing using the error diffusion method and the threshold matrix together is described using FIG. 21. In the figure, reference character dither[x][y] designates a threshold matrix value (component) of a position (x,y). Reference character th_dth[i][level] designates a comparison value with the threshold matrix (a threshold to be compared with the threshold matrix) depending on the gradation (i=0,1,2). Reference character th_edf[level] designates an error diffusion threshold. Reference character dot[j][level] is made to correspond to a dot size (droplet kind) which is one of [no droplet, small droplet, middle droplet, large droplet] for each gradation value (level) (j=0, 1,2,3).

When each pixel quantization processing is started, first, by taking a sum of an original gradation value of the target pixel and a peripheral error diffused to the target pixel by the error diffusion, the gradation value including the peripheral error is calculated (step S101).

Next, by comparing the value (dither[x][y]) of the threshold matrix with the threshold th_dth[i][level], an area of the image is divided. The threshold th_dth[i][level] is set for each gradation value (level) of the target pixel, and is stored in a predetermined memory beforehand. Here, division is performed into four areas, using a first threshold th_dth[0][level], a second threshold th_dth[1][level], and a third threshold th_dth[2][level].

First, the value of the threshold matrix and the first threshold th_dth[0][level] are compared (step S102). As a result of comparison, in the case that the value of the threshold matrix is smaller, the dot size specified by dot[0][level] is selected (step S103).

In step S102, in the case that the value of the threshold matrix is equal to or larger than the first threshold, the value of the threshold matrix and the second threshold th_dth[1][level] are compared subsequently (step S104). As a result of the comparison, in the case that the value of the threshold matrix is smaller, the dot size specified by dot[1][level] is selected (step S105).

In step S104, in the case that the value of the threshold matrix is equal to or larger than the second threshold, the value of the threshold matrix and the third threshold th_dth[2][level] are compared further (step S106). In the case that the value of the threshold matrix is equal to or smaller than the third threshold th_dth[2][level], the processing advances to step S107, and the gradation value including the peripheral error and the error diffusion threshold th_edf[level] are compared (step S107). The error diffusion threshold th_edf[level] is also set for each gradation value of the target pixel, and is stored in the predetermined memory beforehand. As a result of the comparison in step S107, in the case that the gradation value including the peripheral error is smaller than the error diffusion threshold, the dot size specified by dot[2][level] is selected (step S108).

On the other hand, in step S107, in the case that the gradation value including the peripheral error is equal to or larger than the error diffusion threshold, the dot size specified by dot[3][level] is selected (step S109). In this way, in the area wherein a dither threshold is equal to or smaller than the third threshold (and equal to or larger than the second threshold), the processing of binarization by the error diffusion method is performed.

Also, in step S106, in the case that the value of the threshold matrix is larger than the third threshold, the dot size specified by dot[4][level] is selected (step S110).

Note that the dot sizes of the individual dot[j][level] can be appropriately determined for each gradation value. For example, for a certain gradation value, it can be determined that dot[0][level] is the small droplet, dot[1][level] is the middle droplet, dot[2][level] is no droplet, dot[3][level] is the large droplet, and dot[4][level] is the large droplet. Basically, it is sufficient when dot[3][level]>dot[2][level] is satisfied, and the individual values are determined so as to deposit a large dot when the quantization error is large and to deposit a small dot when it is small.

After the dot size of the target pixel is selected as described above, the quantization error is calculated (step S111). The quantization error is an error generated by quantizing the gradation value including the peripheral error, and is a difference between the gradation value including the peripheral pixel and the quantization threshold. The quantization threshold is the gradation value made to correspond to dot[0][level], dot[1][level], dot[2][level], dot[3][level], and dot[4][level] respectively.

The calculated quantization error is diffused to the peripheral pixels according to the predetermined error diffusion matrix (see FIG. 16) (step S112). Subsequently, by shifting the target pixel of the quantization to the adjacent pixel and performing the similar processing, all the pixels are quantized.

According to the above-described quantization processing, recording rates of dot[0][level], dot[1][level], and dot[4][level] of the individual areas pertinent to steps S103, S105 and S110 are determined according to the threshold matrix, and the recording rates for the remaining areas are determined by performing the binarization by the error diffusion method (steps S108 and S109). By performing the quantization in this way, the recording rates of four values can be uniquely determined for each gradation.

In this example, for each threshold th_dth[i][level], the threshold in the original gradation value of the target pixel is used, however, the threshold in the gradation value including the peripheral error may be used.

<Image Processor Using Error Diffusion Method and Threshold Matrix Together>

An image processor that quantizes continuous tone images using the error diffusion method and the threshold matrix together is described. In a configuration in FIG. 22, the same signs are attached to elements same as or similar to that in the configurations described in FIG. 15 and FIG. 20, and the description is omitted.

Figure 22:
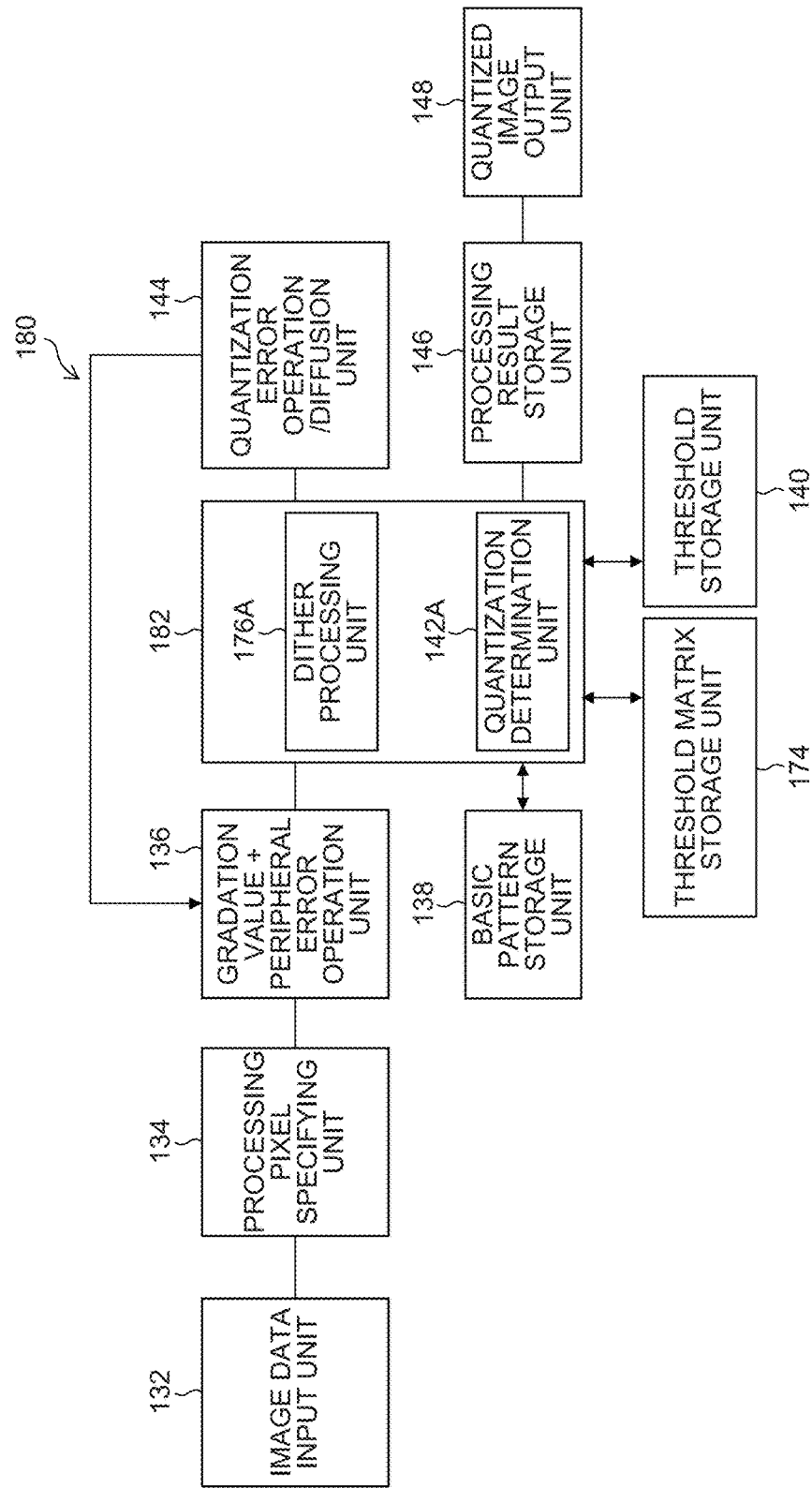
FIG. 22 is a block diagram of an image processor that uses the error diffusion method and the threshold matrix together.

As illustrated in FIG. 22, an image processor 180 includes the image data input unit 132, the processing pixel specifying unit 134, the operation unit 136 (described as "gradation value+peripheral error operation unit" in FIG. 22), the basic pattern storage unit 138, the threshold storage unit 140, the quantization error operation/diffusion unit 144, the processing result storage unit 146, the quantized image output unit 148, the threshold matrix storage unit 174, and a quantization processing unit 182.

The quantization processing unit 182 includes a quantization determination unit 142A that compares the value obtained from the operation unit 136 with the threshold for quantization determination, and quantizes a pixel value so as to satisfy the restriction condition of the basic pattern further, and a dither processing unit 176A that quantizes the input image by referring to the threshold matrix stored in the threshold matrix storage unit 174.

The image processor 180 performs the quantization according to a flowchart illustrated in FIG. 21.

As described above, by performing the quantization utilizing the basic pattern, the density fluctuation can be suppressed so that the visibility of the vibration irregularities and the inter-module joint irregularities can be reduced.

<Example of Print Head>

The quantization method according to the present embodiment is applicable for the second image data for which dots are arranged by the same recording element respectively for the individual pixels of the pixel column along the first direction and dots are arranged at a plurality of different timings for the individual pixels of the pixel column along the second direction orthogonal to the first direction.

As a print head that performs such recording, the two-dimensional print head 300 illustrated in FIGS. 2A and 2B, the print head 310 illustrated in FIG. 4, the print head 320 illustrated in FIG. 5, and the two-dimensional print head 10 illustrated in FIG. 13 or the like is applicable. In these print heads, the paper feed direction (nozzle column vertical direction) corresponds to the first direction, and the paper feed vertical direction (nozzle column direction) corresponds to the second direction.

Also, for a print head 30 of a multi scan system illustrated in FIGS. 23A-23E, a plurality of nozzles 32 are arranged, and the individual nozzles 32 are lined practically at the interval of two pixels and arranged along the paper feed direction (nozzle column direction, a right direction in FIGS. 23A-23E) respectively.

Figure 23A:
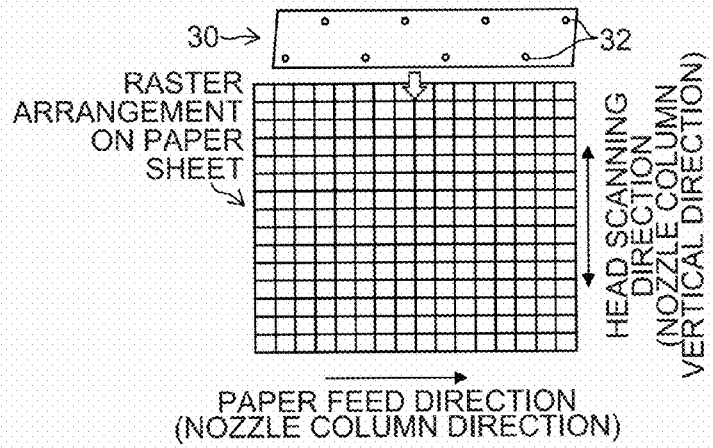
FIGS. 23A-23E are diagrams illustrating an arrangement of a print head 30 of a multiscan system and rasters formed on a paper sheet.
Figure 23B:
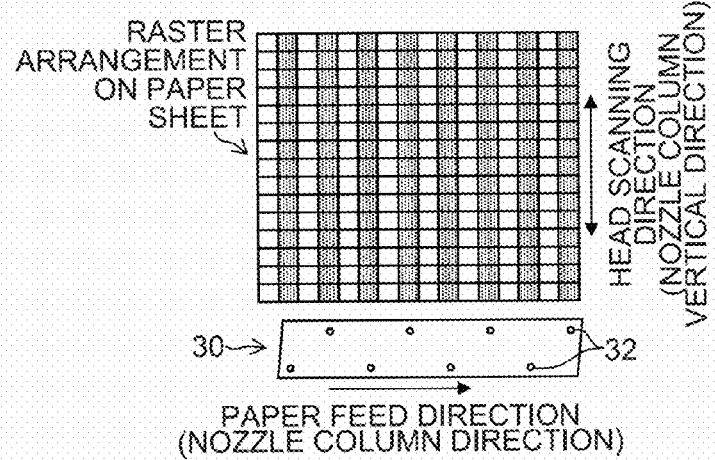

The print head 30 ejects the ink from the nozzles 32 to a first pixel column on a paper sheet, while scanning is performed in a head scanning direction from the state illustrated in FIG. 23A to the state illustrated in FIG. 23B.

Figure 23C:
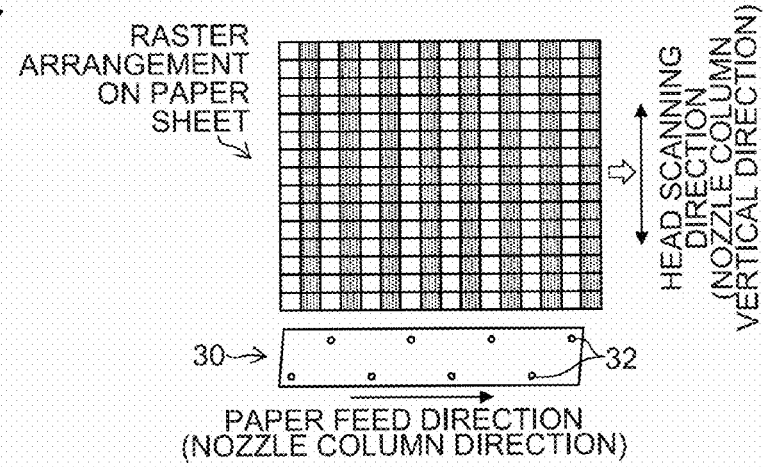
Figure 23D:
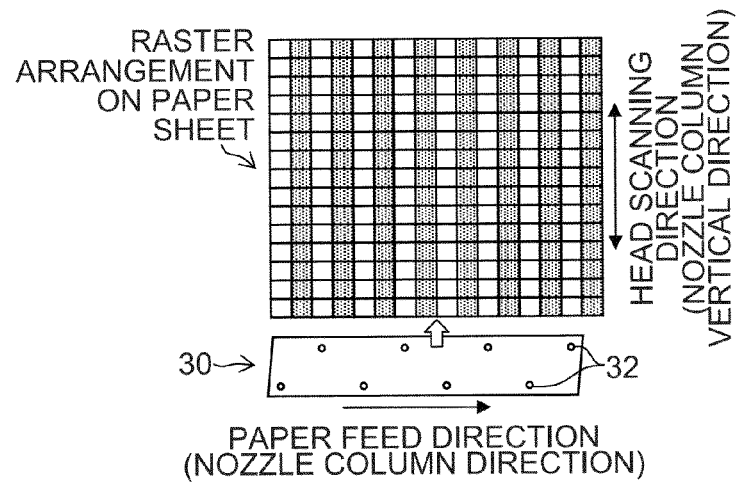
Figure 23E:
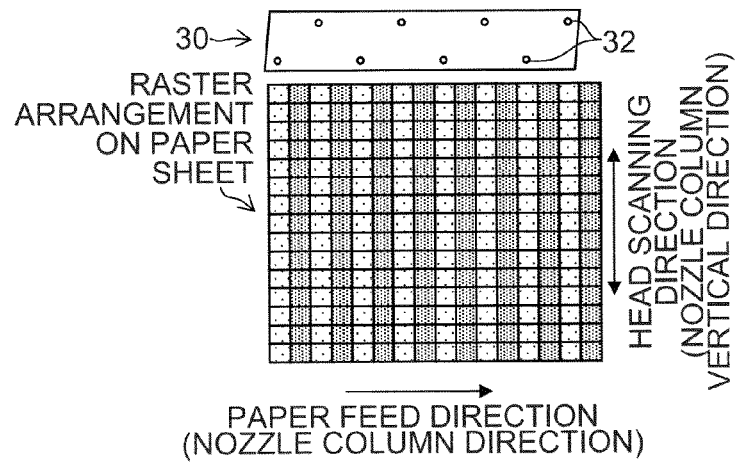

Thereafter, the paper sheet is fed for one pixel in the paper feed direction as illustrated in FIG. 23C, and the ink is ejected from the individual nozzles 32 to a second pixel column on the paper sheet while scanning is performed from the state illustrated in FIG. 23D to the state illustrated in FIG. 23E, further.

When focusing on the pixel column lined in the head scanning direction of the image printed by the print head 30 configured in this way, the individual pixels are printed by the same nozzle respectively.

Also, when focusing on the pixel column lined in the paper feed direction, the pixels for which the ink is ejected at the first timing and the pixels for which the ink is ejected at the second timing different from the first timing are alternately arranged pixel by pixel. That is, the individual pixels of the pixel column along the paper feed direction are printed at the two different timings. In FIGS. 23A-23E, the pixels for which the ink is ejected at the first timing and the pixels for which the ink is ejected at the second timing in the pixel column lined in the paper feed direction are expressed by respectively different densities.

The quantization method according to the present embodiment is also applicable for image data printed by the multiscan system by the print head 30. Here, the head scanning direction corresponds to the first direction, and the paper feed direction corresponds to the second direction.

Figure 24:
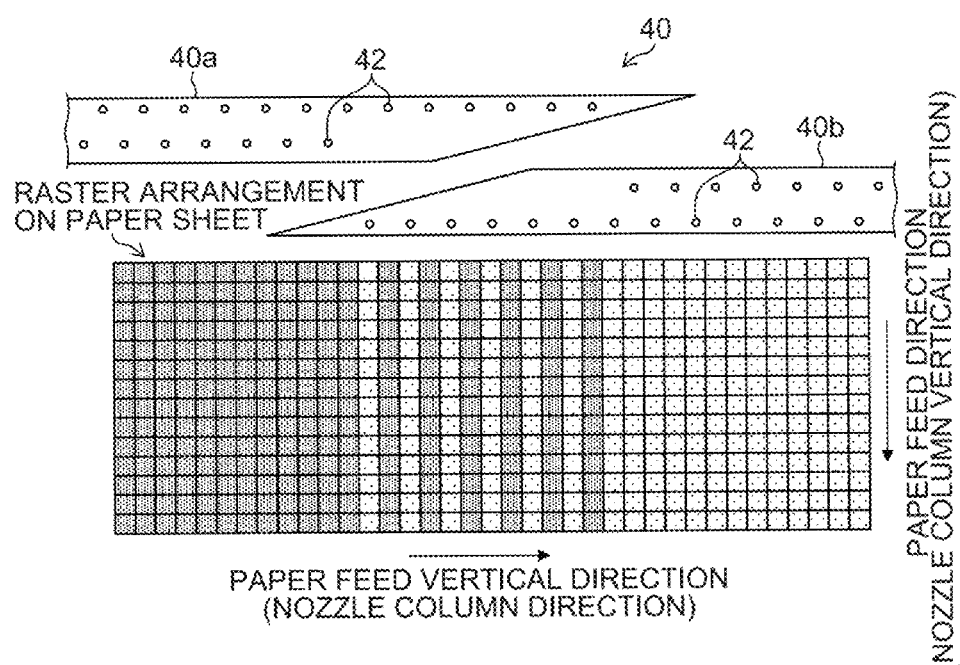
FIG. 24 is a diagram illustrating an arrangement of a two-dimensional print head 40 and rasters formed on a paper sheet.

A two-dimensional print head 40 illustrated in FIG. 24 includes a head module 40a (one example of a first head module) and a head module 40b (one example of a second head module). The head module 40a and the head module 40b are shifted from each other and arranged in the paper feed direction (nozzle column vertical direction), and are arranged so as to overlap in the paper feed direction at a joint.

In the head module 40a and the head module 40b, the plurality of nozzles 42 are arranged respectively. Also, in the joint area, in the head module 40a and the head module 40b, the nozzles are lined and arranged at the interval of two pixels in the paper feed vertical direction (nozzle column direction) respectively, and are shifted from each other by one pixel and arranged in the paper feed vertical direction. Therefore, the nozzles 42 of the head module 40a and the nozzles 42 of the head module 40b are alternately arranged practically nozzle by nozzle along the paper feed vertical direction.

When focusing on the pixel column lined in the paper feed direction in the joint area of the image printed while moving the paper sheet (not shown in FIG. 24) in the paper feed direction by the two-dimensional print head 40 configured in this way, the pixel column where the ink is ejected from the nozzles 42 of the head module 40a and the pixel column where the ink is ejected from the nozzles 42 of the head module 40a are provided. That is, the individual pixels of the pixel column along the paper feed direction are printed by the same nozzle respectively.

Also, when focusing on the pixel column lined in the paper feed vertical direction, the pixels for which the ink is ejected from the nozzles 42 of the head module 40a at the first timing and the pixels for which the ink is ejected from the nozzles 42 of the head module 40b at the second timing different from the first timing are alternately arranged pixel by pixel. That is, the individual pixels of the pixel column along the paper feed vertical direction are printed at the two different timings. In FIG. 24, the pixels for which the ink is ejected at the first timing and the pixels for which the ink is ejected at the second timing in the pixel column lined in the paper feed vertical direction are expressed by the respectively different densities.

The quantization method according to the present embodiment is applicable also for image data printed by the single path system by the print head 40. Here, the paper feed direction corresponds to the first direction, and the paper feed vertical direction corresponds to the second direction.

Figure 25:
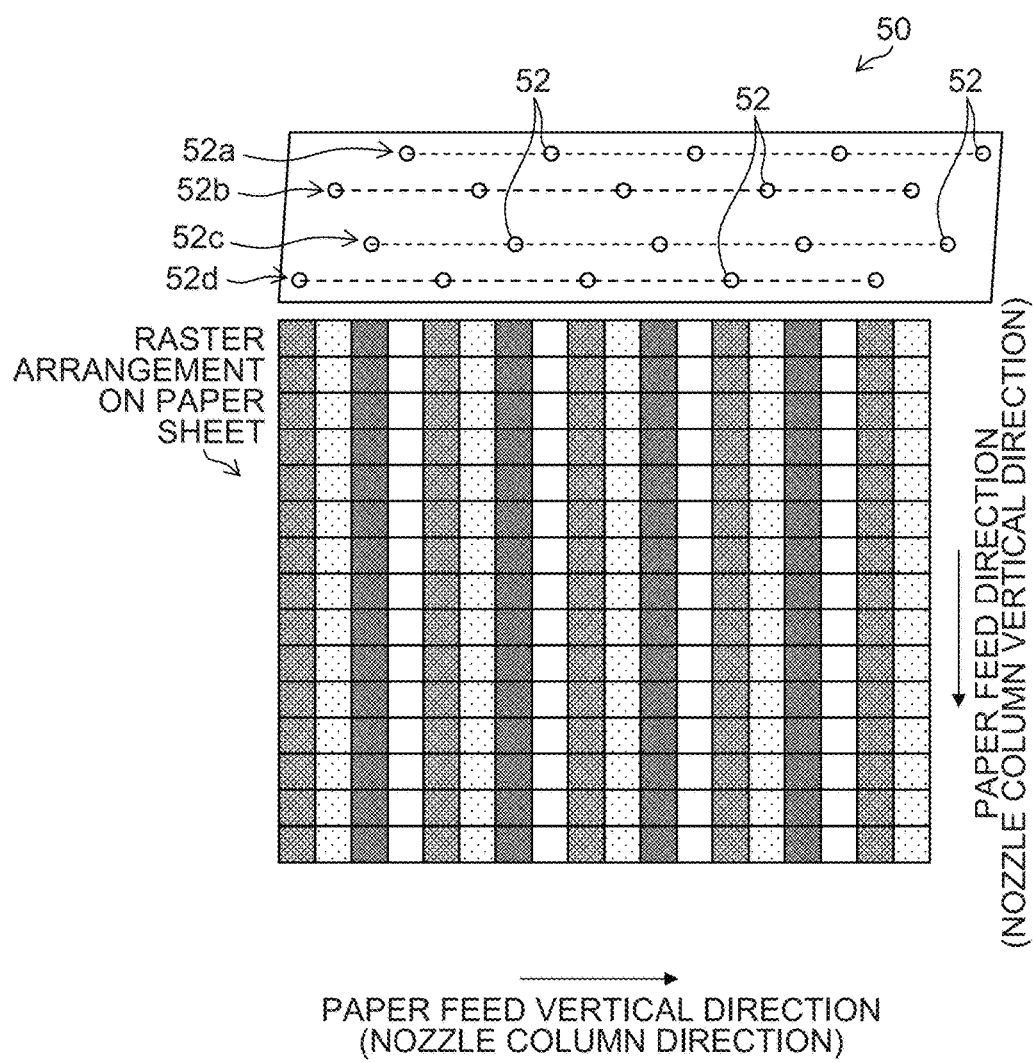
FIG. 25 is a diagram illustrating an arrangement of a two-dimensional print head 50 and rasters formed on a paper sheet.

Also, in a two-dimensional print head 50 illustrated in FIG. 25, a plurality of nozzles 52 are two-dimensionally arranged. The plurality of nozzles 52 configure four nozzle columns that are the nozzle columns 52a, 52b, 52c and 52d in order from the upstream side in the paper feed direction (nozzle column vertical direction), and the plurality of columns are arranged in the paper feed direction. The individual nozzles 52 of the nozzle columns 52a, 52b, 52c and 52d are lined and arranged at the interval of four pixels in the paper feed vertical direction (nozzle column direction) respectively, and shifted from each other by one pixel each and arranged in the paper feed vertical direction. Therefore, the nozzles 52 of the nozzle columns 52a, 52b, 52c and 52d are cyclically arranged practically nozzle by nozzle along the paper feed vertical direction.

When focusing on the pixel column lined in the paper feed direction of the image printed while moving the paper sheet (not shown in FIG. 25) in the paper feed direction by the two-dimensional print head 50 configured in this way, the pixel column where the ink is ejected from the nozzles 52 of the nozzle column 52a, the pixel column where the ink is ejected from the nozzles 52 of the nozzle column 52b, the pixel column where the ink is ejected from the nozzles 52 of the nozzle column 52c, and the pixel column where the ink is ejected from the nozzles 52 of the nozzle column 52d are provided. That is, the individual pixels of the pixel column along the paper feed direction are printed by the same nozzle respectively.

Also, when focusing on the pixel column lined in the paper feed vertical direction, the pixels for which the ink is ejected from the nozzles 52 of the nozzle column 52a on the most upstream side at the first timing, the pixels for which the ink is ejected from the nozzles 52 of the nozzle column 52b on the upstream side next to the nozzle column 52a at the second timing different from the first timing, the pixels for which the ink is ejected from the nozzles 52 of the nozzle column 52c on the upstream side next to the nozzle column 52b at a third timing different from the first timing and the second timing, and the pixels for which the ink is ejected from the nozzles 52 of the nozzle column 52d on the most downstream side at a fourth timing different from the first timing, the second timing and the third timing are cyclically arranged pixel by pixel. That is, the individual pixels of the pixel column along the paper feed vertical direction are printed at the four different timings for the nozzle columns 52a, 52b, 52c and 52d respectively (one example of the timings different for each recording element). In FIG. 25, the pixels for which the ink is ejected at the first timing to the fourth timing in the pixel column lined in the paper feed vertical direction are expressed by the respectively different densities.

The quantization method according to the present embodiment is applicable also for image data printed by the single path system by the print head 50. Here, the paper feed direction corresponds to the first direction, and the paper feed vertical direction corresponds to the second direction.

<About Configuration of Inkjet Recorder>

Figure 26:
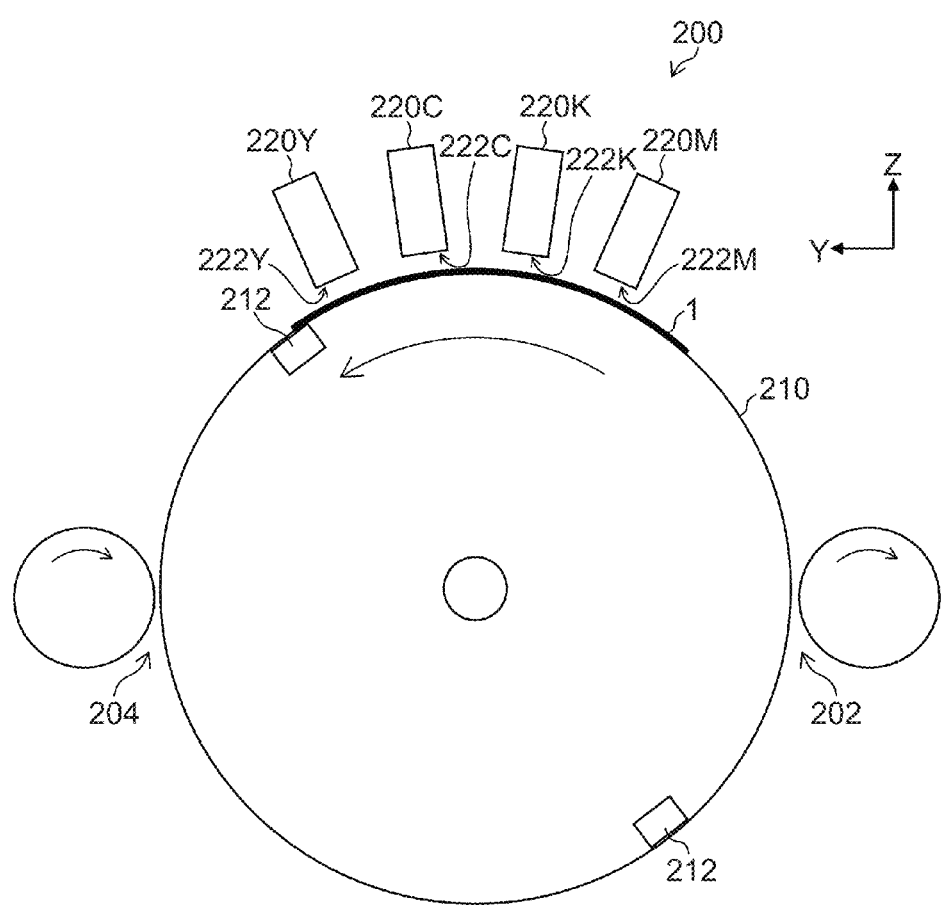
FIG. 26 is a side schematic diagram of an inkjet recorder 200.

As illustrated in FIG. 26, an inkjet recorder 200 (one example of an image recorder) wherein the image processor of the present embodiment is used is a line printer of the single path system that records images on a recording surface of a paper sheet 1, and includes a conveyance drum 210, and inkjet heads 220M, 220K, 220C and 220Y or the like.

On positions facing each other across a rotary shaft of a conveyance surface of the conveyance drum 210, two grippers 212 for gripping a distal end of the paper sheet 1 are provided. Also, on the conveyance surface of the conveyance drum 210, many suction holes (not shown in the figure) are formed in a predetermined pattern. The paper sheet 1 introduced from a paper feed unit 202 is gripped at the distal end by the grippers 212, and wound around a peripheral surface of the rotating conveyance drum 210. Further, the paper sheet 1 is sucked and held by the peripheral surface of the conveyance drum 210 by being sucked from the suction holes. The conveyance drum 210 conveys the sucked and held paper sheet 1 in the Y direction which is a rotating direction of the conveyance drum 210. The Y direction is pertinent to the paper feed direction.

The four inkjet heads 220M, 220K, 220C and 220Y are arranged in order from the upstream side at a predetermined interval in the paper feed direction of the conveyance drum 210. The inkjet heads 220M, 220K, 220C and 220Y include nozzle surfaces 222M, 222K, 222C and 222Y facing the conveyance drum 210 respectively, and on the individual nozzle surfaces 222M, 222K, 222C and 222Y, the plurality of nozzles (see FIG. 27) for ejecting magenta ink (M ink), black ink (K ink), cyan ink (C ink) and yellow ink (Y ink) respectively are formed over the entire width of the paper sheet 1.

As the inkjet heads 220M, 220K, 220C and 220Y, the two-dimensional print head 300 illustrated in FIGS. 2A and 2B, the print head 310 illustrated in FIG. 4, the print head 320 illustrated in FIG. 5, the two-dimensional print head 10 illustrated in FIG. 13, the two-dimensional print head 40 illustrated in FIG. 24, and the two-dimensional print head 50 illustrated in FIG. 25 or the like are applicable.

Figure 27:
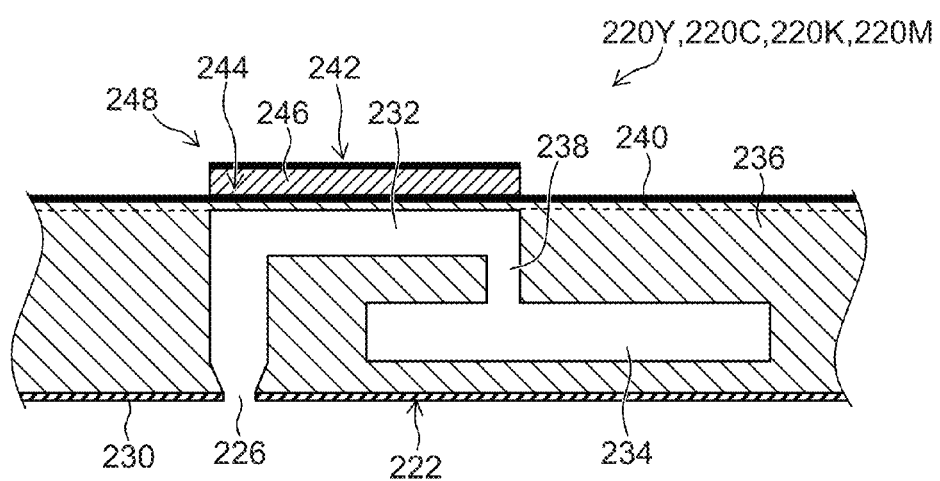
FIG. 27 is a sectional view of a recording element corresponding to one nozzle 226.

The inkjet heads 220M, 220K, 220C and 220Y are, as illustrated in FIG. 27, formed of a structure for which a nozzle plate 230 where a nozzle 226 is formed and a passage plate 236 where a pressure chamber 232 and passages such as a common passage 234 are formed or the like are laminated and joined. The nozzle plate 230 configures a part of the nozzle surface 222 of the head 220, and the plurality of nozzles 226 communicated with the individual pressure chambers 232 respectively are two-dimensionally formed.

The passage plate 236 is a passage forming member that configures a sidewall part of the pressure chamber 232, and forms a supply port 238 as a narrowed part (the most constricted part) of an individual supply path that guides the ink from the common passage 234 to the pressure chamber 232. Note that, for convenience of description, it is simply illustrated in FIG. 27, however, the passage plate 236 is a structure for which one or a plurality of substrates are laminated.

The nozzle plate 230 and the passage plate 236 can be worked into a required shape by a semiconductor manufacturing process with silicon as a material.

The common passage 234 is communicated with an ink tank (not shown in the figure) which is an ink supply source, and the ink supplied from the ink tank is supplied through the common passage 234 to the individual pressure chambers 232.

To a diaphragm 240 configuring a partial surface of the pressure chamber 232 (a top surface in FIG. 27), a piezo actuator 248 having a structure that an individual electrode 242 and a lower electrode 244 are provided and a piezoelectric body 246 is held between the individual electrode 242 and the lower electrode 244 is joined. When the diaphragm 240 is configured by a metal thin film or a metal oxide film, it functions as a common electrode corresponding to the lower electrode 244 of the piezo actuator 248. Note that, in the form of forming the diaphragm by a non-conductive material such as a resin, a lower electrode layer by a conductive material such as a metal is formed on a surface of a diaphragm member.

By applying a drive voltage to the individual electrode 242, the piezo actuator 248 is deformed, the volume of the pressure chamber 232 is changed, and the ink is ejected from the nozzles 226 by pressure change accompanying it. After the ink is ejected, when the piezo actuator 248 returns to an original state, new ink is refilled from the common passage 234 through the supply port 238 into the pressure chamber 232.

In this example, the piezo actuator 248 is applied as an ejection power generation device of the ink to be ejected from the nozzles 226 provided on the heads 220, however, it is also possible to apply a thermal system of providing a heater inside the pressure chamber 232 and ejecting the ink by utilizing a pressure of film boiling by heating of the heater.

<Electrical Configuration of Inkjet Recorder>

Figure 28:
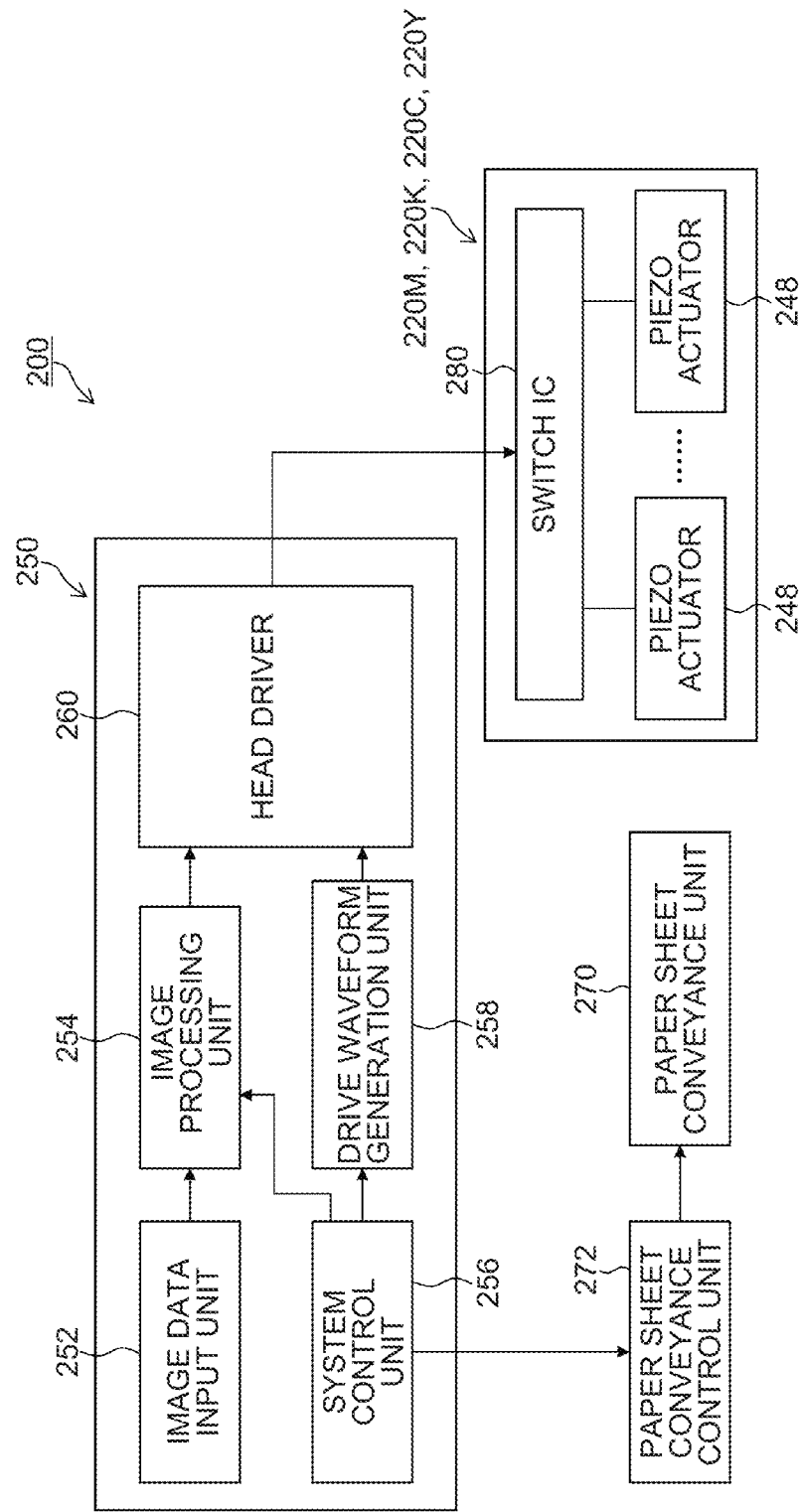
FIG. 28 is a block diagram illustrating a main part configuration of the inkjet recorder 200.

FIG. 28 is a block diagram illustrating a main part configuration of the inkjet recorder 200. The inkjet recorder 200 includes the inkjet heads 220M, 220K, 220C and 220Y, a controller 250 that controls a recording operation by the individual heads 220, and a paper sheet conveyance unit 270.

The inkjet heads 220M, 220K, 220C and 220Y include the plurality of piezo actuators 248 as ejection energy generation elements that generate ejection energy required for ink ejection corresponding to the individual nozzles 226 (see FIG. 27), and a switch IC (Integrated Circuit) 280 that switches drive/non-drive of the individual piezo actuators 248.

In the case of an inkjet head including a two-dimensional nozzle array, a projected nozzle column for which the individual nozzles in the two-dimensional nozzle array are projected (orthogonally projected) so as to be lined along the paper feed vertical direction can be considered as the one equivalent to one nozzle column in which the nozzles are lined at roughly equal intervals in a nozzle density that achieves a recording resolution for the paper feed vertical direction. The "equal interval" here means that they are at practically equal intervals as ejection points printable in an inkjet printing system. For example, even the case of including the ones for which the interval is slightly made different or the like in consideration of movement of droplets on a medium due to errors on manufacture and impact interference is included in the concept of "equal interval". When considering the projected nozzle column (also called "practical nozzle column"), nozzle positions (nozzle numbers) can be made to correspond to an arrangement orders of projected nozzles lined along the paper feed vertical direction. In the case of saying "nozzle position" in the following description, it indicates the position of the nozzle in the practical nozzle column.

The controller 250 includes a system control unit 256, an image data input unit 252 that functions as an input interface unit which receives multigraded image data (one example of the first image data) to be printed, and an image processing unit 254 that performs density correction and the quantization processing to the inputted image data. Also, the controller 250 includes a drive waveform generation unit 258 and a head driver 260.

The image processing unit 254 is a signal processing device that converts the input image data to binary or multivalued dot data (one example of the second image data). For the image processing unit 254, the above-described image processors 130, 170, and 180 can be applied.

As a device of the quantization processing (halftone processing), the above-described threshold matrix system, the system utilizing the error diffusion method, and the system using the threshold matrix and the error diffusion together can be applied. In the quantization processing, generally, the image data of m value (m is an integer equal to or larger than 3) is converted to gradation image data of n value (n is an integer equal to or larger than 2 and smaller than m) with a small number of gradations than m. In the simplest example, the image data is converted to binary (ON/OFF of dots) dot image data, however, in the quantization processing, it is also possible to perform multivalued quantization corresponding to the kinds (for example, three kinds such as a large dot, a middle dot, and a small dot) of the dot size.

The binary or multivalued image data (dot data) generated in the image processing unit 254 is utilized as ink ejection control data (droplet ejection control data) that controls drive (ON)/non-drive (OFF) of the individual nozzles and a droplet amount (dot size) in the case of the multiple value further. The dot data (droplet ejection control data) generated in the image processing unit 254 is supplied to the head driver 260, and an ink ejecting operation of the inkjet heads 220M, 220K, 220C and 220Y is controlled.

The drive waveform generation unit 258 is a device that generates a drive voltage signal waveform for driving the piezo actuators 248 corresponding to the individual nozzles 226 of the inkjet heads 220M, 220K, 220C and 220Y. Waveform data of drive voltage signals is stored in a storage device such as a ROM (Read Only Memory) beforehand, and the waveform data to be used is outputted as needed. A signal (drive waveform) generated in the drive waveform generation unit 258 is supplied to the head driver 260. The signal outputted from the drive waveform generation unit 258 may be digital waveform data, or may be an analog voltage signal.

The inkjet recorder 200 indicated in this example adopts a drive system of ejecting the ink from the nozzles 226 corresponding to the individual piezo actuators 248 by supplying a common drive power waveform signal through the switch IC 280 to the individual piezo actuators 248 of the inkjet heads 220M, 220K, 220C and 220Y and switching ON/OFF of a switch element connected to the individual electrode of the pertinent piezo actuator 248 according to the ejection timing of the individual nozzles 226. The inkjet heads 220M, 220K, 220C and 220Y eject ink droplets on demand according to a drive signal and an ejection control signal supplied from the head driver 260.

A combination of the system control unit 256, the image data input unit 252, and the image processing unit 254 in FIG. 28 corresponds to "the image processor".

The paper sheet conveyance unit 270 (one example of a conveyance device) is configured including the conveyance drum 210 and a motor that rotates the conveyance drum 210. The system control unit 256 (one example of a recording controller) controls the paper sheet conveyance unit 270 through a paper sheet conveyance control unit 272. Thus, the paper sheet 1 (see FIG. 26) is conveyed to the inkjet heads 220M, 220K, 220C and 220Y. The paper sheet conveyance control unit 272 and the paper sheet conveyance unit 270 correspond to "a relative moving device".

<Another Aspect of Electrical Configuration of Inkjet Recorder>

Figure 29:
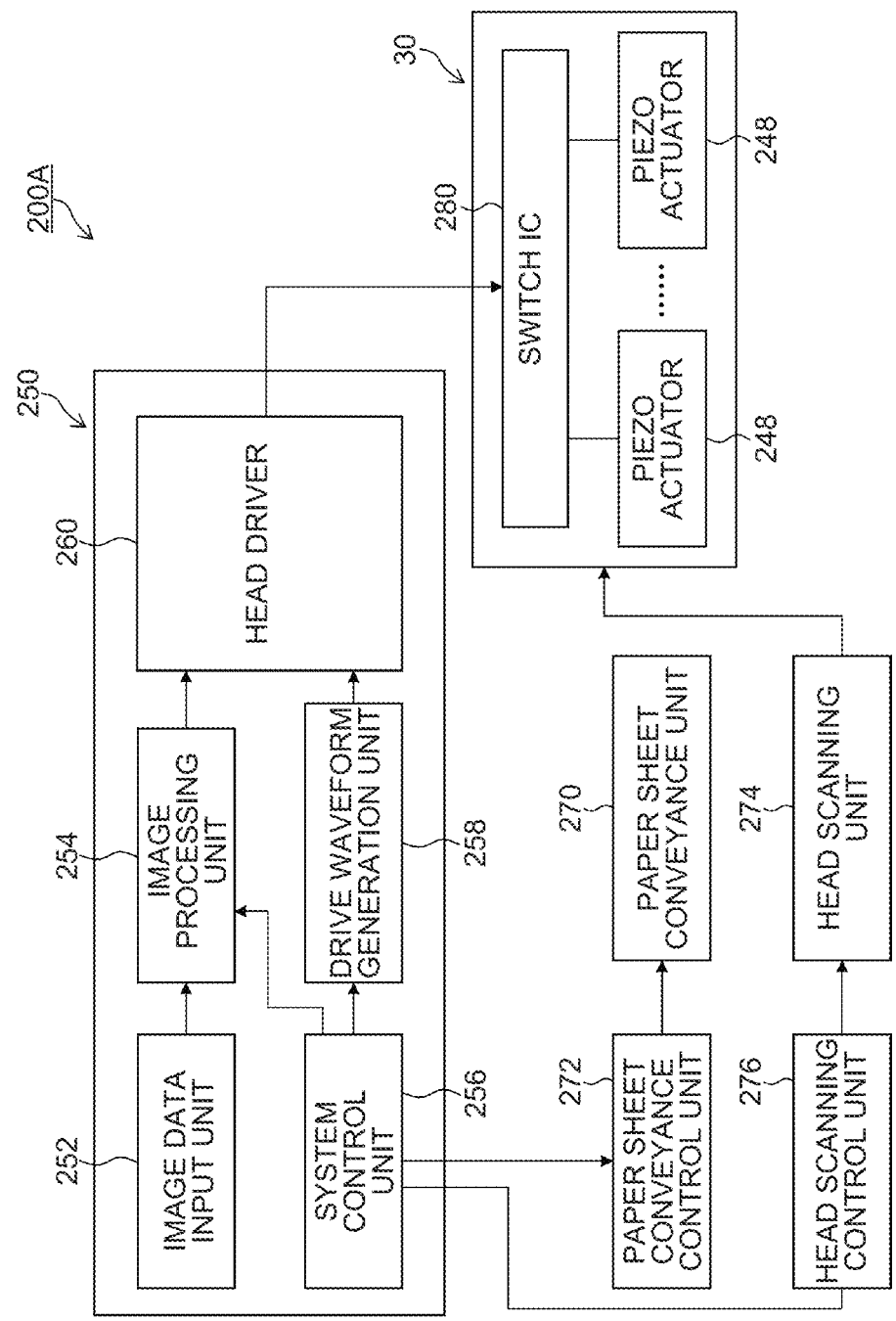
FIG. 29 is a block diagram illustrating a main part configuration of an inkjet recorder 200A.

FIG. 29 is a block diagram illustrating a main part configuration of the inkjet recorder 200A of the multiscan system. The same signs are attached to parts in common with the inkjet recorder 200 illustrated in FIG. 28, and the detailed description is omitted.

The inkjet recorder 200A is a printer that records images by the multiscan system described using FIGS. 23A-23E, and includes a head scanning unit 274, a head scanning control unit 276, and a recording head.

The head scanning unit 274 (one example of a head scanning device) reciprocally moves the recording head (reference numeral 10 in FIG. 13) for a head scanning direction illustrated in FIG. 13 (one example of reciprocal scanning). The system control unit 256 controls the head scanning unit 274 through the head scanning control unit 276. Here, the paper sheet conveyance unit 270, the paper sheet conveyance control unit 272, the head scanning unit 274, and the head scanning control unit 276 correspond to "a moving device".

On a nozzle surface (not shown in the figure) of the recording head, a plurality of nozzles (not shown in the figure) are arranged. In a projected nozzle column for which the plurality of nozzles are projected (orthogonally projected) so as to be lined along the paper feed direction, projected nozzles are arranged at the interval of M pixels (M is a natural number). That is, the nozzles are arranged practically at the interval of M pixels along the paper feed direction.

The system control unit 256 controls the paper sheet conveyance unit 270 and the head scanning unit 274 through the paper sheet conveyance control unit 272 and the head scanning control unit 276, conveys the paper sheet 1 (not shown in FIG. 29) for a predetermined amount every time the recording head is moved once in the head scanning direction (at each scanning), moves the recording head for M times, and thus completes printing in a predetermined area of the image.

<About Recording Medium>

"Recording medium" is a general term of a medium where dots are recorded by a recording head, and includes the ones called by various terms such as a recording medium, a print medium, a recording target medium, an image formation target medium, an image receiving medium, and an ejection target medium. When implementing the present invention, a material and a shape or the like of the recording medium are not limited in particular, and it is applicable to various media regardless of the material and the shape, such as a continuous paper sheet, a cut paper, a sealing paper sheet, a resin sheet such as an OHP (Overhead Projector) sheet, a film, fabric, nonwoven fabric, a printed board where a wiring pattern or the like is formed, and a rubber sheet.

<Device Application Example>

In the above-described embodiment, application to the inkjet recorder for graphic printing is described as an example, however, an application range of the present invention is not limited by the example. For example, it is widely applicable to inkjet devices that draw various shapes and patterns using a liquid functional material, such as a wiring drawing device that draws a wiring pattern of an electronic circuit, a manufacturing device of various kinds of devices, a resist recorder using a resin liquid as a functional liquid for ejection, a color filter manufacturing device, and a fine structure forming device that forms a fine structure using a material for material deposition.

<About Utilization Form of Recording Head Other than Inkjet System>

In the above description, the inkjet recorder is illustrated as one example of an image forming device that uses a recording head, however, the application range of the present invention is not limited by the example. Other than the inkjet system, the present invention is applicable for image forming devices of various kinds of systems that record dots, such as a heat transfer recorder including a recording head with a thermal element as a recording element, an LED (Light Emitting Diode) electrophotographic printer including a recording head with an LED element as the recording element, and a silver-halide photograph type printer having an LED line exposure head.

For the embodiment of the present invention described above, constituent elements can be appropriately changed, added and deleted without departing from the meaning of the present invention. The present invention is not limited by the embodiment described above, and many modifications are possible by a person having ordinary skill in the art within the technical ideas of the present invention.

What is claimed is:

1. A quantization method comprising:
a quantization step of quantizing first image data, and converting the first image data to second image data that indicates a binary or multivalued quantized pattern with a smaller number of gradations than that of the first image data, for which dots are arranged by the same recording element for individual pixels of a pixel column along a first direction respectively and dots are arranged at a plurality of different timings for individual pixels of a pixel column along a second direction orthogonal to the first direction; and
an optimization step of performing optimization the quantization step in at least some gradations, and reducing dispersion of a generation frequency of a dot arrangement for each relative positional relation between a pixel of interest in the case that individual pixels within the quantized pattern are successively defined as the pixel of interest and vicinity pixels that are the plurality of vicinity pixels positioned in a vicinity of the pixel of interest and include an adjacent pixel adjacent to the pixel of interest in the second direction and a next adjacent pixel successively adjacent to the adjacent pixel in the first direction, compared to the dispersion before the optimization; and
wherein the second image data is recorded by an image recorder comprising:
a recording head which includes a plurality of recording elements and has a two-dimensional recording element array for which a plurality of recording element columns with a plurality of recording elements arrayed in the second direction are arranged in the first direction;
a moving device which relatively moves the recording head and a recording medium only once in the first direction; and
a recording control device which records the second image data by the recording head while relatively moving the recording head and the recording medium, arranges dots to the individual pixels of the pixel column along the first direction by the same recording element respectively, and arranges dots to the individual pixels of the pixel column along the second direction at different timings for each recording element column.

2. The quantization method according to claim 1, wherein the vicinity pixels include the adjacent pixel, a first next adjacent pixel adjacent to the adjacent pixel in the first direction, and a second next adjacent pixel adjacent to the first next adjacent pixel in the first direction, the second next adjacent pixel being different from the adjacent pixel.

3. The quantization method according to claim 1, wherein the optimization step comprises:
an evaluation value calculation step of calculating a plurality of evaluation values correlated to a positional correlation function component for each relative positional relation respectively; and
a change step of changing the quantized pattern based on a difference of the plurality of evaluation values.

4. The quantization method according to claim 3,
wherein in the quantization step, the first image data is quantized using a threshold matrix,
in the evaluation value calculation step, the plurality of evaluation values are calculated for a pattern for which the threshold matrix is binarized or multivalued by a specific threshold respectively, and
in the change step, the threshold matrix is optimized by changing the dot arrangement corresponding to the evaluation value with a relatively large difference from an average value of the plurality of evaluation values from the plurality of evaluation values, for the pattern for which the threshold matrix is binarized or multivalued by the specific threshold.

5. The quantization method according to claim 1,
wherein the optimization step comprises:
an optimum determination evaluation value calculation step of calculating an optimum determination evaluation value correlated to dispersion of a plurality of evaluation values correlated to a positional correlation function component for each relative positional relation; and
a determination step of determining whether or not the quantized pattern is optimum based on the optimum determination evaluation value.

6. The quantization method according to claim 5,
wherein the optimum determination evaluation value includes an evaluation value correlated to low frequency noise and graininess.

7. The quantization method according to claim 5,
wherein in the quantization step, the first image data is quantized by an error diffusion method, and the quantization step includes:
an evaluation pattern generation step of generating an evaluation pattern which is a temporary quantized pattern using a temporary error diffusion coefficient; and
an updating step of updating the temporary error diffusion coefficient as an optimum error diffusion coefficient in the case that the evaluation pattern is determined as being optimum by the determination step.

8. The quantization method according to claim 1,
wherein in the optimization step, the dispersion of the generation frequency for an image of a first kind value of the binary value and the multiple value, or an image for which a combination of the first kind value and a second kind value different from the first kind value is extracted, in reduced compared to the dispersion before the optimization.

9. The quantization method according to claim 1,
wherein in the quantization step, the first image data is quantized by an error diffusion method, and
in the optimization step, an error diffusion coefficient used in the error diffusion method is optimized.

10. The quantization method according to claim 1,
wherein in the quantization step, the first image data is quantized using a threshold matrix, and
in the optimization step, the threshold matrix is optimized.

11. The quantization method according to claim 1,
wherein:
the recording head which includes a plurality of recording elements has a recording element column for which the plurality of recording elements are arranged along the second direction at an interval of M pixels, wherein M is an integer of 2 or more;
the moving device which relatively moves the recording head and a recording medium in the first direction further includes a head scanning device that makes the recording head scan the recording medium back and forth in the first direction and a conveyance device that moves the recording medium in the second direction for each scan in the first direction of the recording head; and
the recording control device which records the second image data by the recording head while relatively moving the recording head and the recording medium records the individual pixels of the pixel column along the first direction by the same recording element respectively in scan of one time of the recording head further records the individual pixels of the pixel column along the second direction at M kinds of different timings by scan of M times.

12. The quantization method according to claim 1,
wherein:
the recording head which includes a plurality of recording elements is configured by joining a plurality of head modules where the plurality of recording elements are arranged respectively in the second direction, for which, at a joint of adjacent first head module and second head module, the recording elements of the first head module and the recording elements of the second head module are alternately arranged along the second direction;
the recording control device which records the second image data by the recording head while relatively moving the recording head and the recording medium records the individual pixels of the pixel column along the second direction at the joint at different timings in the first head module and the second head module.

13. An image processor comprising:
an image acquisition device that acquires first image data;
a quantization device that quantizes the first image data, and converts the first image data to second image data that indicates a binary or multivalued quantized pattern with a smaller number of gradations than that of the first image data, for which dots are arranged by the same recording element for individual pixels of a pixel column along a first direction respectively and dots are arranged at a plurality of different timings for individual pixels of a pixel column along a second direction orthogonal to the first direction; and
an optimization device that performs optimization of the quantization device in at least some gradations, and reduces dispersion of a generation frequency of a dot arrangement for each relative positional relation between a pixel of interest in the case that individual pixels within the quantized pattern are successively defined as the pixel of interest and vicinity pixels that are a plurality of vicinity pixels positioned in a vicinity of the pixel of interest and include an adjacent pixel adjacent to the pixel of interest in the second direction and a next adjacent pixel successively adjacent to the adjacent pixel in the first direction, compared to the dispersion before the optimization; and
wherein the second image data is recorded by an image recorder comprising:
a recording head which includes a plurality of recording elements and has a two-dimensional recording element array for which a plurality of recording element columns with a plurality of recording elements arrayed in the second direction are arranged in the first direction;
a moving device which relatively moves the recording head and a recording medium only once in the first direction; and
a recording control device which records the second image data by the recording head while relatively moving the recording head and the recording medium, arranges dots to the individual pixels of the pixel column along the first direction by the same recording element respectively, and arranges dots to the individual pixels of the pixel column along the second direction at different timings for each recording element column.

* * * * *